(12) United States Patent
Wang et al.

(10) Patent No.: US 12,355,276 B2
(45) Date of Patent: Jul. 8, 2025

(54) POWER SUPPLY SYSTEM AND METHOD OF SERVER, ELECTRONIC DEVICE, AND STORAGE MEDIUM

(71) Applicant: SUZHOU METABRAIN INTELLIGENT TECHNOLOGY CO., LTD., Jiangsu (CN)

(72) Inventors: Lingyan Wang, Jiangsu (CN); Deyang Hua, Jiangsu (CN); An Wu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/867,994

(22) PCT Filed: Jun. 20, 2023

(86) PCT No.: PCT/CN2023/101211
§ 371 (c)(1),
(2) Date: Nov. 21, 2024

(87) PCT Pub. No.: WO2024/113773
PCT Pub. Date: Jun. 6, 2024

(65) Prior Publication Data
US 2025/0118974 A1  Apr. 10, 2025

(30) Foreign Application Priority Data
Nov. 28, 2022 (CN) .......................... 202211498135.6

(51) Int. Cl.
*H01M 10/44* (2006.01)
*H01M 10/46* (2006.01)
(Continued)

(52) U.S. Cl.
CPC .............. *H02J 7/0013* (2013.01); *H02J 3/32* (2013.01); *H02J 7/00032* (2020.01);
(Continued)

(58) Field of Classification Search
CPC .... H02J 7/0063; H02J 7/0013; H02J 7/00032; H02J 7/005; H02J 2310/16; H02J 9/062; H02J 3/32
(Continued)

(56) References Cited

U.S. PATENT DOCUMENTS

| 2013/0181526 A1* | 7/2013 | Iwasaki | ............... H01M 10/441 307/43 |
| 2017/0187207 A1* | 6/2017 | Li | ....................... H02J 7/00302 |

(Continued)

FOREIGN PATENT DOCUMENTS

| CN | 109830974 A | 5/2019 |
| CN | 110854954 A | 2/2020 |

(Continued)

*Primary Examiner* — Edward Tso
(74) *Attorney, Agent, or Firm* — IPro, PLLC

(57) ABSTRACT

A power supply system and method of a server, an electronic device, and a storage medium are provided. By means of cooperative work of main circuit structures such as a high-voltage battery power master control unit, battery string management and control units, and power conversion string management and control units, power information of each subsystem in the power supply system is collected and analyzed in real time, and the high-voltage battery power master control unit can also issue a corresponding control instruction to each subsystem according to the analysis result so as to realize power control of each subsystem, thereby controlling the total output power of the server.

19 Claims, 6 Drawing Sheets

(51) Int. Cl.
*H02J 3/32* (2006.01)
*H02J 7/00* (2006.01)
*H02J 9/06* (2006.01)

(52) U.S. Cl.
CPC .......... *H02J 7/00304* (2020.01); *H02J 7/005* (2020.01); *H02J 7/0063* (2013.01); *H02J 9/062* (2013.01); *H02J 2310/16* (2020.01)

(58) Field of Classification Search
USPC ....... 320/104, 107, 109, 114, 115, 132, 148, 320/150
See application file for complete search history.

(56) References Cited

U.S. PATENT DOCUMENTS

2018/0301914 A1   10/2018  Fornage et al.
2019/0123368 A1*  4/2019  Wang ................ H01M 8/04865

FOREIGN PATENT DOCUMENTS

| CN | 113489080 A | 10/2021 |
| CN | 113922438 A | 1/2022 |
| CN | 114530898 A | 5/2022 |
| CN | 115603431 A | 1/2023 |

* cited by examiner

POWER SUPPLY SYSTEM AND METHOD OF SERVER, ELECTRONIC DEVICE, AND STORAGE MEDIUM

CROSS REFERENCE TO RELATED APPLICATION

The present application claims the priority of the Chinese patent application 202211498135.6 titled "POWER SUPPLY SYSTEM AND METHOD OF SERVER, ELECTRONIC DEVICE, AND STORAGE MEDIUM" filed in China National Intellectual Property Administration on Nov. 28, 2022, which is incorporated herein by reference in their entirety.

TECHNICAL FIELD

The present application relates to the technical field of server power supply, and in particular to a power supply system of a server, a power supply method of a server, an electronic device, and a computer non-transitory readable storage medium.

BACKGROUND

A data center is a globally collaborative specific device network for transmitting, accelerating, displaying, calculating, and storing data information on a network infrastructure. With the widespread application of data centers, more and more telecommunications, Netcom, mobile, dual-line, power enterprises, etc. have successively chosen to use data centers to store servers and provide information technology (IT) services for users and employees. In order to achieve uninterrupted power supply of data center servers, it is usually necessary to equip data center servers with uninterruptible power system/supply (UPS) which may reliably power them.

Most traditional data centers use one or two AC power supply buses and UPS power supply system architecture to achieve uninterrupted power supply and improve the reliability of power consumption in data centers. The process of uninterrupted power supply of data center servers through UPS involves mains power conversion and charging and discharging of internal batteries. In the UPS power supply system, when the mains input is normal, the UPS filter and stabilizes the mains and supplies it to the server power supply in the data center, while charging the internal battery components of the UPS. When the mains input fails, the UPS will immediately convert the DC power in the battery components into AC power through the inverter to supply the server power supply in the data center.

In the conventional technology, the alternating current/direct current (AC/DC) conversion and direct Current/alternating Current (DC/AC) conversion of the UPS are the main links of energy loss in the power transmission of the entire power supply system. The efficiency loss of each conversion between AC and DC is about 5%, and the converted AC power also needs power factor correction (PFC) to improve the power factor, which leads to an additional level of conversion loss. During the entire power supply process, multiple losses of energy conversion lead to low power efficiency and large heat loss in high-power servers in the data center. The UPS power supply is located in the main power path, and the heat accumulation caused by high-power and long-term uninterrupted operation greatly increases the power failure rate, thereby seriously affecting the power reliability of data center servers.

SUMMARY

Embodiments of the present application provide a power supply system of a server, a power supply method of a server, an electronic device and a non-transitory computer readable storage medium, so as to solve or partially solve problems of low power efficiency, large heat loss and low power reliability in the existing power supply system of the server.

An embodiment of the present application provides a power supply system of a server, including at least one power supply module, wherein the power supply module at least includes a high-voltage battery power master control unit, at least one power conversion string control unit, at least one battery string control unit and a state monitoring management unit respectively connected to the high-voltage battery power master control unit, a power conversion unit connected to the power conversion string control unit, and a battery string unit connected to the battery string control unit, each battery string unit is correspondingly connected to a power conversion unit, and various power conversion units are connected in parallel and then connected to the state monitoring management unit;

the battery string control unit is configured to send a state information table corresponding to the battery string unit to the high-voltage battery power master control unit, receive a switching control instruction generated by the high-voltage battery power master control unit based on the state information table, and control a switching state of the battery string unit based on the switching control instruction;

the power conversion string control unit is configured to receive a power control instruction generated by the high-voltage battery power master control unit based on the state information table, and control the power conversion unit to acquire an output voltage from the battery string unit based on the power control instruction;

the power conversion unit is configured to adjust the output voltage from a first predetermined voltage range to a second predetermined voltage range, and transmit the adjusted output voltage to the state monitoring management unit, and the second predetermined voltage range is within the first predetermined voltage range; and the state monitoring management unit is configured to calculate a total output power based on the adjusted output voltage, and output the total output power to the server.

In some embodiments, the battery string control unit is configured to:

collect power information of the battery string unit, and analyze a health state of the battery string unit based on the power information, to generate the state information table corresponding to the battery string unit.

In some embodiments, the power information includes a plurality of voltage, current and temperature signals in the battery string unit, and the battery string control unit is configured to:

collect the plurality of voltage, current and temperature signals in the battery string unit, and analyze the health state of the battery string unit based on the plurality of voltage, current and temperature signals, to generate the state information table.

In some embodiments, the high-voltage battery power master control unit is configured to:
  receive the state information table sent by the battery string control unit, compare the state information table with predetermined total output data, generate the switching control instruction and the power control instruction, send the switching control instruction to the battery string control unit, and send the power control instruction to the power conversion string control unit corresponding to the battery string control unit.

In some embodiments, the battery string control unit is configured to:
  convert the switching control instruction into a switching control signal, and send the switching control signal to the battery string unit; and the battery string unit is configured to:
  control a power switching tube in the battery string unit to switch to a switching state corresponding to the switching control signal.

In some embodiments, the power conversion string control unit is configured to:
  convert the power control instruction into a power control signal, and send the power control signal to the power conversion unit; and
  the power conversion unit is configured to:
  perform a voltage acquisition operation corresponding to the power control signal to acquire an output voltage from a battery string unit corresponding to the power conversion unit.

In some embodiments, the power conversion unit is configured to:
  reallocate power to battery string units other than a faulty battery string unit based on a predetermined power threshold when the faulty battery string unit is detected.

In some embodiments, the power conversion unit is further configured to:
  adjust an input voltage state and an output voltage state of the power conversion unit, to adjust an output voltage of a battery cell in a battery string unit corresponding to the power conversion unit from the first predetermined voltage range to the second predetermined voltage range.

In some embodiments, the power conversion string control unit is configured to:
  receive a voltage conversion instruction sent by the high-voltage battery power master control unit, and execute the voltage conversion instruction, to control voltage conversion between power conversion units corresponding to the voltage conversion instruction.

In some embodiments, the high-voltage battery power master control unit is configured to:
  receive the total output power sent by the state monitoring management unit, and control the power supply module to output the total output power to the server as a total power output value of the server; or
  control the power supply module to output a predetermined total power output value to the server as the total power output value of the server.

In some embodiments, the high-voltage battery power master control unit is further configured to:
  allocate evenly the total output power, or the predetermined total power output value to each battery string unit when power information of each battery string unit meets a predetermined power condition; and
  determine power of an abnormal battery string unit based on a predetermined derated output power, and calculate power corresponding to remaining battery string units that meets the predetermined power condition based on the total output power, or the predetermined total power output value and the power of the abnormal battery string unit, when the abnormal battery string unit with power information not meeting the predetermined power condition is present.

In some embodiments, the battery string control unit is configured to:
  acquire a turn-off control instruction sent by the high-voltage battery power control unit, and execute a turn-off operation corresponding to the turn-off control instruction, to turn off a power output of the adjusted battery string unit, when power information of the adjusted battery string unit still does not meet the predetermined power condition.

In some embodiments, the high-voltage battery power master control unit is configured to:
  analyze output power of each battery string unit based on the state information table and the predetermined output power, and determine a voltage difference between any two battery string units based on the analysis result; and
  send a discharging control instruction to a power conversion string control unit corresponding to a high-voltage battery string unit to control the high-voltage battery string unit to discharge a low-voltage battery string unit when the voltage difference is greater than or equal to a first predetermined voltage difference threshold.

In some embodiments, the high-voltage battery power master control unit, or a battery string control unit corresponding to the high-voltage battery string unit, is configured to:
  send a bypass control instruction to the high-voltage battery string unit to control the high-voltage battery string unit to bypass a first battery cell, when the first battery cell with a discharging value greater than or equal to a predetermined discharging threshold is present in the high-voltage battery string unit.

In some embodiments, the high-voltage battery power master control unit, or a battery string control unit corresponding to the low-voltage battery string unit, is configured to:
  send a bypass control instruction to the low-voltage battery string unit to control the low-voltage battery string unit to bypass a second battery cell, when the second battery cell with a charging value greater than or equal to a predetermined charging threshold is present in the low-voltage battery string unit.

In some embodiments, the high-voltage battery power master control unit is configured to:
  send a bypass control instruction to a battery string unit corresponding to a low-voltage battery cell to control to bypass the low-voltage battery cell when a high-voltage battery cell and the low-voltage battery cell with a voltage difference greater than or equal to a second predetermined voltage difference threshold are detected to be discharged at the same time; and
  control to release a bypass state of the low-voltage battery cell when the voltage difference between the high-voltage battery cell and the low-voltage battery cell is less than the second predetermined voltage difference threshold, so that the high-voltage battery cell and the low-voltage battery cell are discharged at the same time.

In some embodiments, the high-voltage battery power master control unit is configured to:

send a bypass control instruction to an abnormal battery string unit corresponding to an abnormal battery cell to control the abnormal battery string unit to bypass the abnormal battery cell, when the abnormal battery cell with abnormal charging and discharging is detected in any battery string unit.

In some embodiments, the high-voltage battery power master control unit is configured to:
determine a battery string unit with any bypassed battery cell as a bypass battery string unit, analyze a health state of the bypassed battery cell and health states of other battery string units in the bypass battery string unit when the bypass battery string unit is in a discharging state, and adjust power allocation of the bypass battery string unit by the total output power based on the analysis result; and
control a power conversion unit corresponding to the bypass battery string unit to continue charging a third battery cell with a charging value less than the predetermined charging threshold in the bypass battery string unit when the bypass battery string unit is in a charging state, and control to bypass the third battery cell when the charging value of the third battery cell is greater than or equal to the predetermined charging threshold.

In some embodiments, the high-voltage battery power master control unit is configured to:
control to turn off a power switching tube in the bypass battery string unit to release a bypass state of the bypassed battery cell when the bypass battery string unit meeting a predetermined charging state is detected.

In some embodiments, the high-voltage battery power master control unit is configured to:
send a charging control instruction to a power conversion string control unit corresponding to the power conversion unit when a voltage of the power conversion unit is detected to be lower than the predetermined voltage threshold, so that the power conversion string control unit executes the charging control instruction and controls turn-on and turn-off states of a power switching tube in the power conversion unit to control to charge a battery string unit corresponding to the power conversion unit.

In some embodiments, the power supply module includes an overall battery pack power unit, the overall battery pack power unit includes a total voltage and current detection unit, at least one power conversion management unit connected in parallel with the total voltage and current detection unit, a voltage and current detection unit connected to the power conversion management unit, and a battery string unit connected to the voltage and current detection unit, each power conversion management units is correspondingly connected to a voltage and current detection unit, each power conversion management unit includes a power conversion unit and a corresponding power conversion string control unit, and each battery string unit includes a plurality of battery power combination cells connected in series.

In some embodiments, the voltage and current detection unit is configured to detect voltage and current information of a series branch including various battery power combination cells, the total voltage and current detection unit is configured to detect total voltage and current information of various series branches connected in parallel, and the high-voltage battery power master control unit is configured to receive the total voltage and current information and various voltage and current information to control charging and discharging of various battery string units.

In some embodiments, the battery power combination cell includes a battery cell CC1, a power switching tube CQ1 and a power switching tube CQ2 connected to the battery cell CC1, a fuse CR1 and a fuse CR2 connected to the power switching tube CQ2, and an impedance matching resistor RR1 connected to the fuse CR2, and the fuse CR2 is connected in series with the impedance matching resistor RR1 and then connected in parallel with the fuse CR1.

In some embodiments, the power switching tube CQ1 and the power switching tube CQ2 are respectively connected to a battery string control unit corresponding to the battery power combination cell; and
a voltage monitoring point is provided between a drain and a source of the power switching tube CQ1, a temperature collection point is provided at power integration of the power switching tube CQ1 and the battery cell CC1, and the battery string control unit is configured to collect voltage information of the voltage monitoring point and temperature information of the temperature monitoring point.

In some embodiments, the battery cell CC1 is a main carrier of output energy, the fuse CR1 is configured to control an abnormal high-current discharging fault of a branch corresponding to the battery cell, and a series branch of the fuse CR2 and the impedance matching resistor RR1 is configured to control to correct a mistakenly fused branch corresponding to the fuse CR1 to be turned on.

In some embodiments, the power conversion unit includes a capacitor C1, a power switching tube Q1 and a power switching tube Q2 connected to the capacitor C1, an energy storage inductor L1 connected to the power switching tube Q2, a power switching tube Q3 and a power switching tube Q4 connected to the energy storage inductor L1, and a capacitor C2 connected to the power switching tube Q4, and a relay T1 is connected in parallel with both ends of the energy storage inductor L1.

In some embodiments, the power switching tubes Q1 to Q4 are connected to a power conversion string control unit corresponding to the power conversion unit, the relay T1 is connected to the power conversion string control unit, and the power conversion string control unit is configured to control to turn on and turn off the power switching tubes Q1 to Q4 and the relay T1.

In some embodiments, the power supply system includes an external output bus, and the power conversion string control unit is configured to:
control to the relay T1 to be turned off, control the power switching tube Q1 to be constantly turned on, control the power switching tube Q2 to be constantly turned off, control the power switching tube Q3 and the power switching tube Q4 to be alternately turned on, and adjust the power conversion unit to a buck topology structure, when the external output bus charges the battery string unit through the power conversion unit and a voltage of the external output bus is higher than a voltage of the battery string unit; and
control the power switching tube Q3 to be constantly turned on, control the power switching tube Q4 to be constantly turned off, control the power switching tube Q1 and the power switching tube Q2 to be alternately turned on, and adjust the power conversion unit a boost topology structure, when the voltage of the external output bus is lower than the voltage of the battery string unit.

In some embodiments, the power conversion string control unit is configured to:

control the relay T1 to be turned off, control the power switching tube Q1 to be constantly turned on, control the power switching tube Q2 to be constantly turned off, control the power switching tube Q3 and the power switching tube Q4 to be alternately turned on, and adjust the power conversion unit to the boost topology structure, when the battery string unit discharges the external output bus through the power conversion unit and the voltage of the external output bus is higher than the voltage of the battery string unit; and control the power switching tube Q3 to be constantly turned on, control the power switching tube Q4 to be constantly turned off, control the power switching tube Q1 and the power switching tube Q2 to be alternately turned on, and adjust the power conversion unit to the buck topology structure, when the voltage of the external output bus is lower than the voltage of the battery string unit.

In some embodiments, when a first target battery string unit and a second target battery string unit that are required to be charged and discharged with each other are present, a power conversion string control unit corresponding to the first target battery string unit is configured to control a switching state of the power conversion unit corresponding to the first target battery string unit; and a power conversion string control unit corresponding to the second target battery string unit is configured to control a switching state of the power conversion unit corresponding to the second target battery string unit and adjust a topology structure corresponding to the power conversion unit.

In some embodiments, when a voltage difference between the first target battery string unit and the second target battery string unit is greater than a third predetermined voltage difference threshold, the power conversion string control unit corresponding to the first target battery string unit is configured to:

control the switching state of the power conversion unit corresponding to the first target battery string unit to reduce the voltage difference between the first target battery string unit and the second target battery string unit; and the power conversion string control unit corresponding to the second target battery string unit is configured to:

control the switching state of the power conversion unit corresponding to the second target battery string unit, and adjust the topology structure corresponding to the power conversion unit to control charging and discharging between the first target battery string unit and the second target battery string unit.

In some embodiments, the state monitoring management unit includes total output voltage detection, total output current detection and an output switch, and the output switch is configured to receive a control instruction sent by the high-voltage battery power master control unit.

An embodiment of the present application provides a power supply method of a server, wherein a power supply system is applied to the server, the power supply system includes at least one power supply module, the power supply module at least includes a high-voltage battery power master control unit, at least one power conversion string control unit, at least one battery string control unit and a state monitoring management unit respectively connected to the high-voltage battery power master control unit, a power conversion unit connected to the power conversion string control unit, and a battery string unit connected to the battery string control unit, each battery string unit is correspondingly connected to a power conversion unit, various power conversion units are connected in parallel and then connected to the state monitoring management unit, and the method includes:

sending, by the battery string control unit, a state information table corresponding to the battery string unit to the high-voltage battery power master control unit;

receiving a switching control instruction generated by the high-voltage battery power master control unit based on the state information table, and controlling a switching state of the battery string unit based on the switching control instruction;

receiving, by the power conversion string control unit, a power control instruction generated by the high-voltage battery power master control unit based on the state information table, and controlling the power conversion unit to acquire an output voltage from the battery string unit based on the power control instruction;

adjusting, by the power conversion unit, the output voltage from a first predetermined voltage range to a second predetermined voltage range, and transmitting the adjusted output voltage to the state monitoring management unit, wherein the second predetermined voltage range is within the first predetermined voltage range; and calculating, by the state monitoring management unit, a total output power based on the adjusted output voltage, and outputting the total output power to the server.

In some embodiments, the method further includes:

collecting power information of the battery string unit through the battery string control unit, and analyzing a health state of the battery string unit based on the power information, to generate a state information table corresponding to the battery string unit.

In some embodiments, the power information includes a variety of voltage, current and temperature signals in the battery string unit, and the collecting power information of the battery string unit through the battery string control unit, and analyzing a health state of the battery string unit using the power information, to generate a state information table corresponding to the battery string unit, includes:

collecting various voltage, current and temperature signals of the battery string units through the battery string control unit, and analyzing the health state of the battery string unit based on the various voltage, current and temperature signals, to generate the state information table.

In some embodiments, the method further includes:

receiving the state information table sent by the battery string control unit through the high-voltage battery power master control unit, comparing the state information table with predetermined total output data, generating a switching control instruction and a power control instruction, sending the switching control instruction to the battery string control unit, and sending the power control instruction to the power conversion string control unit corresponding to the battery string control unit.

In some embodiments, controlling the switching state of the battery string unit based on the switching control instruction includes:

converting the switching control instruction into a switching control signal through the battery string control unit, and sending the switching control signal to the battery string unit; and controlling a power switching tube in the battery string unit to switch to a switching state corresponding to the switching control signal through the battery string unit.

In some embodiments, controlling the power conversion unit to acquire the output voltage from the battery string unit based on the power control instruction includes:

converting the power control instruction into a power control signal through the power conversion string control unit, and sending the power control signal to the power conversion unit; and performing a voltage acquisition operation corresponding to the power control signal by the power conversion unit, to acquire an output voltage from the battery string unit corresponding to the power conversion unit.

In some embodiments, the method further includes:

allocating power to battery string units other than a faulty battery string unit by the power conversion unit using a predetermined power threshold when the faulty battery string unit is detected.

In some embodiments, the method further includes:

adjusting an input voltage state and an output voltage state of the power conversion unit by the power conversion unit, to adjust an output voltage of the battery cell in the battery string unit corresponding to the power conversion unit from the first predetermined voltage range to the second predetermined voltage range, where the second predetermined voltage range is within the first predetermined voltage range.

In some embodiments, the method further includes:

receiving a voltage conversion instruction sent by the high-voltage battery power master control unit by the power conversion string control unit, and executing the voltage conversion instruction, to control the voltage conversion between power conversion units corresponding to the voltage conversion instruction.

In some embodiments, the method further includes:

receiving the total output power sent by the state monitoring management unit by the high-voltage battery power master control unit, and controlling the power supply module to output the total output power to the server as a total power output value of the server; or controlling the power supply module to output a predetermined total power output value to the server as the total power output value of the server.

In some embodiments, the method further includes:

allocating evenly the total output power, or the predetermined total power output value to each battery string unit by the high-voltage battery power master control unit, when power information of each battery string unit meets the predetermined power condition; and determining power of an abnormal battery string unit based on the predetermined derated output power by the high-voltage battery power master control unit, and determining the power corresponding to remaining battery string units meeting the predetermined power condition based on the total output power, or the predetermined total power output value, and the power of the abnormal battery string unit when the abnormal battery string unit with power information not meeting the predetermined power condition.

In some embodiments, the method further includes:

acquiring a turn-off control instruction sent by the high-voltage battery power control unit by the battery string control unit, and executing a turn-off operation corresponding to the turn-off control instruction to turn off the power output of the adjusted battery string unit, when the power information of the adjusted battery string unit still does not meet the predetermined power condition.

In some embodiments, the method further includes:

analyzing the output power of each battery string unit by the high-voltage battery power master control unit using the state information table and the predetermined output power, and determining the voltage difference between any two battery string units based on the analysis result; and sending a discharging control instruction to a power conversion string control unit corresponding to the relatively high-voltage battery string unit to control the relatively high-voltage battery string unit to discharge the relatively low-voltage battery string unit when the voltage difference is greater than or equal to the first predetermined voltage difference threshold.

In some embodiments, the method further includes:

sending a bypass control instruction to the relatively high-voltage battery string unit by the high-voltage battery power master control unit, or the battery string control unit corresponding to the relatively high-voltage battery string unit, to control the relatively high-voltage battery string unit to bypass the first battery cell when a first battery cell with a discharging value greater than or equal to a predetermined discharge threshold is present in the relatively high-voltage battery string unit.

In some embodiments, the method further includes:

sending a bypass control instruction to the relatively low-voltage battery string unit by the high-voltage battery power master control unit, or the battery string control unit corresponding to the relatively low-voltage battery string unit, to control the relatively low-voltage battery string unit to bypass the second battery cell, when a second battery cell with a charging value greater than or equal to a predetermined charging threshold is present in the relatively low-voltage battery string unit.

In some embodiments, the method further includes:

sending a bypass control instruction to a battery string unit corresponding to the low-voltage battery cell by the high-voltage battery power master control unit to control to bypass the low-voltage battery cell when a high-voltage battery cell and the low-voltage battery cell with a voltage difference greater than or equal to the second predetermined voltage difference threshold are detected to be discharged at the same time, controlling to release a bypass state of the low-voltage battery cell by the high-voltage battery power control unit when the voltage difference between the high-voltage battery cell and the low-voltage battery cell is detected to be less than the second predetermined voltage difference threshold, so that the high-voltage battery cell and the low-voltage battery cell are discharged at the same time.

In some embodiments, the method further includes:

sending a bypass control instruction to an abnormal battery string unit corresponding to an abnormal battery cell by the high-voltage battery power control unit to control the abnormal battery string unit to bypass the abnormal battery cell when the abnormal battery cell with abnormal charging and discharging is detected in any battery string unit.

In some embodiments, the method further includes:

determining a battery string unit with any bypass battery cell as a bypass battery string unit by the high-voltage battery power master control unit, and analyzing a health state of the bypassed battery cell in the bypass battery string unit and health states of other battery string units when the bypass battery string unit is in a discharging state, and adjusting power allocation of the bypass battery string unit using the total output power based on the analysis result; and controlling a power conversion unit corresponding to the bypass battery string unit to continue charging a third battery cell with a charging value less than the predetermined charging threshold in the bypass battery string unit when the bypass battery string unit is in a charging state, and controlling to bypass the third battery cell when the charging value of the third battery cell is greater than or equal to the predetermined charging threshold.

In some embodiments, the method further includes:
controlling to turn off the power switching tube of the bypass battery string unit to release the bypass state of the bypassed battery cell when the bypass battery string unit meeting the predetermined charging state is detected.

In some embodiments, the method further includes:
sending a charging control instruction to a power conversion string control unit corresponding to the power conversion unit by the high-voltage battery power master control unit when the voltage of the power conversion unit is detected to be lower than the predetermined voltage threshold, so that the power conversion string control unit executes the charging control instruction and controls the turn-on and turn-off state of the power switching tube of the power conversion unit to control charging of the battery string unit corresponding to the power conversion unit.

In some embodiments, the power supply module includes an overall battery pack power unit, which includes a total voltage and current detection unit, at least one power conversion management unit connected in parallel with the total voltage and current detection unit, a voltage and current detection unit connected to the power conversion management unit, and a battery string unit connected to the voltage and current detection unit, each power conversion management unit is correspondingly connected to a voltage and current detection unit, each power conversion management unit includes a power conversion unit and a corresponding power conversion string control unit, and each battery string unit is formed by connecting multiple battery power combination cells in series.

In some embodiments, the method further includes:
detecting voltage and current information of a series branch including each battery power combination cell by the voltage and current detection unit;
detecting total voltage and current information of each series branch connected in parallel by the total voltage and current detection unit; and
receiving the total voltage and current information and each voltage and current information by the high-voltage battery power master control unit to control the charging and discharging of each battery string unit.

In some embodiments, the battery power combination cell includes a battery cell CC1, a power switching tube CQ1 and a power switching tube CQ2 connected to the battery cell CC1, a fuse CR1 and a fuse CR2 connected to the power switching tube CQ2, and an impedance matching resistor RR1 connected to the fuse CR2, where the fuse CR2 is connected in series with the impedance matching resistor RR1 and then connected in parallel with the fuse CR1.

In some embodiments, the power switching tube CQ1 and the power switching tube CQ2 are respectively connected to a battery string control unit corresponding to the battery power combination cell. A voltage monitoring point is provided between the drain and the source of the power switching tube CQ1, and a temperature collection point is provided at the power integration of the power switching tube CQ1 and the battery cell CC1. The method also includes:
collecting the voltage information of the voltage monitoring point and the temperature information of the temperature monitoring point by the battery string control unit.

In some embodiments, the battery cell CC1 is a main carrier of output energy, and the method further includes:
controlling an abnormal high-current discharging fault of a branch corresponding to the battery cell by the fuse CR1, and controlling to correct a branch to be turned on by a series branch of the fuse CR2 and the impedance matching resistor RR1 when the branch corresponding to the fuse CR1 is mistakenly fused.

In some embodiments, the power conversion unit includes a capacitor C1, a power switching tube Q1 and a power switching tube Q2 connected to the capacitor C1, an energy storage inductor L1 connected to the power switching tube Q2, a power switching tube Q3 and a power switching tube Q4 connected to the energy storage inductor L1, and a capacitor C2 connected to the power switching tube Q4, and a relay T1 is connected in parallel at both ends of the energy storage inductor L1.

In some embodiments, the power switching tubes Q1 to Q4 are connected to the power conversion string control unit corresponding to the power conversion unit, the relay T1 is connected to the power conversion string control unit, and the method further includes:
controlling the power switching tubes Q1 to Q4 and the relay T1 to be turned on and turned off by the power conversion string control unit.

In some embodiments, the power supply system includes an external output bus, and the method further includes:
controlling, by the power conversion string control unit, the relay T1 to be turned off, the power switching tube Q1 to be constantly turned on, the power switching tube Q2 to be constantly turned off, the power switching tube Q3 and the power switching tube Q4 to be alternately turned on, and adjusting the power conversion unit to a buck topology structure, when the battery string unit discharges the external output bus through the power conversion unit, and the voltage of the external output bus is higher than the voltage of the battery string unit; and
controlling, the power conversion string control unit, the power switching tube Q3 to be constantly turned on, the power switching tube Q4 to be constantly turned off, the power switching tube Q1 and the power switching tube Q2 to be alternately turned on, and adjusting the power conversion unit to a boost topology when the voltage of the external output bus is lower than the voltage of the battery string unit.

In some embodiments, the method further includes:
controlling, by the power conversion string control unit, the relay T1 to be turned off, the power switching tube Q1 to be constantly turned on, the power switching tube Q2 to be constantly turned off, the power switching tube Q3 and the power switching tube Q4 to be alternately turned on, and adjusting the power conversion unit to a boost topology structure, when the battery string unit discharges to the external output bus through the power conversion unit, and the voltage of the external output bus is higher than the voltage of the battery string unit; and controlling, by the power conversion string control unit, the power switching tube Q3 to be constantly turned on, the power switching tube Q4 to be constantly turned off, the power switching tube Q1 and the power switching tube Q2 to be alternately turned on, and adjusting the power conversion unit to a buck topology structure when the voltage of the external output bus is lower than the voltage of the battery string unit.

In some embodiments, the method further includes:

controlling the switching state of the power conversion unit corresponding to the first target battery string unit by the power conversion string control unit corresponding to the first target battery string unit when a first target battery string unit and a second target battery string unit which require to be charged and discharged with each other are present; and controlling the switching state of the power conversion unit corresponding to the second target battery string unit by the power conversion string control unit corresponding to the second target battery string unit, and adjusting the topology structure corresponding to the power conversion unit.

In some embodiments, the method further includes:

controlling the switching state of the power conversion unit corresponding to the first target battery string unit by the power conversion string control unit corresponding to the first target battery string unit to reduce the voltage difference between the first target battery string unit and the second target battery string unit when the voltage difference between the first target battery string unit and the second target battery string unit is greater than a third predetermined voltage difference threshold;

controlling the switching state of the power conversion unit corresponding to the second target battery string unit by the power conversion string control unit corresponding to the second target battery string unit, and adjusting the topology structure corresponding to the power conversion unit to control charging and discharging between the first target battery string unit and the second target battery string unit.

In some embodiments, the state monitoring management unit includes total output voltage detection, total output current detection and an output switch, and the method further includes:

receiving the control instruction sent from the high-voltage battery power control unit through the output switch.

An embodiment of the present application provides an electronic device, including a processor, a communication interface, a memory and a communication bus, wherein the processor, the communication interface and the memory communicate with each other through the communication bus;

the memory is configured to store a computer program; and the processor is configured to perform the program stored in the memory to implement the method according to the embodiments of the present application.

An embodiment of the present application provides a non-transitory computer readable storage medium storing an instruction which, when executed by one or more processors, causes the processors to perform the method according to the embodiments of the present application.

Embodiments of the present application include the following advantages.

Embodiments of the present application provides a supply power system and a supply power method of a server. Through the cooperative work of the main circuit structures such as the high-voltage battery power master control unit, the battery string control unit and the power conversion string control unit, real-time collection and analysis of power information of each subsystem in the power supply system is achieved. The high-voltage battery power master control unit may also send corresponding control instructions to each subsystem according to the analysis results to realize power control of each subsystem, thereby controlling the total output power of the server. The whole main power supply path is simple and reliable, and it is not necessary to convert the high-voltage DC power supply on the input side into electric energy. The design structure between the high-voltage DC power supply inlet and the server power supply inlet is simplified, which may effectively improve the working efficiency of the power supply system and reduce heat loss. When the main power supply system outside the server operates abnormally, the power supply demand of the server may be ensured, and the conversion efficiency and working reliability of the power supply system may be ensured.

DETAILED DESCRIPTION OF THE EMBODIMENTS

In order to make the above objectives, features and advantages of the present application more apparent, the present application is further described in detail below with reference to the accompanying drawings and detailed description.

Figure 1:
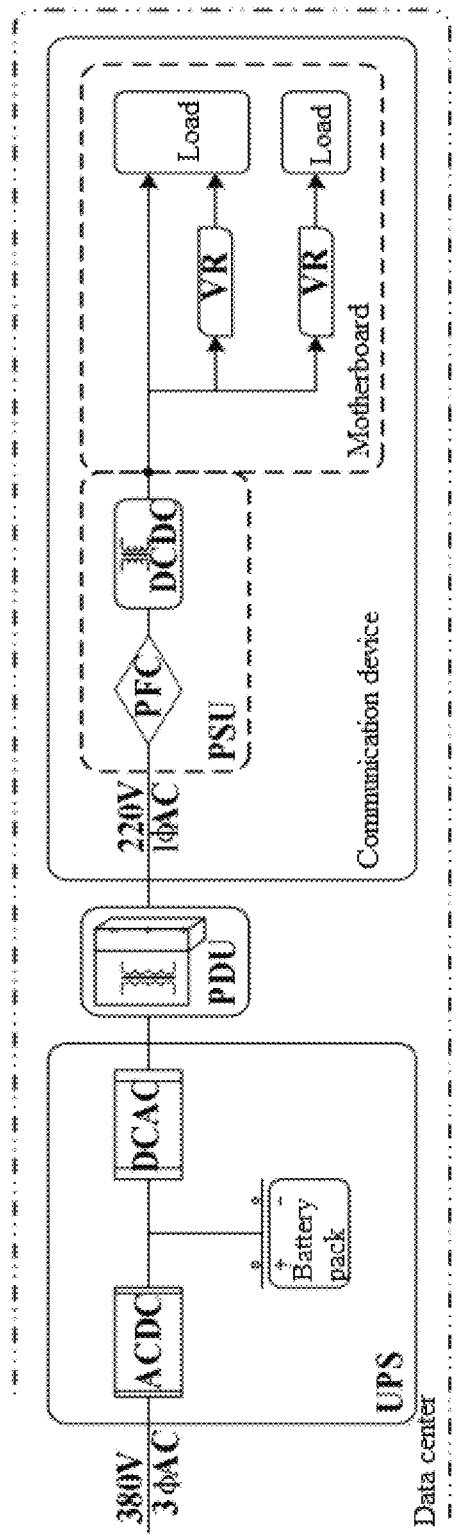
FIG. 1 is a schematic structure diagram of a power supply system of an existing data center.

As an example, as shown in FIG. 1, a schematic structure diagram of a power supply system of an existing data center is shown.

Most traditional data centers use one or two AC power supply buses and uninterruptible power system/supply (UPS) power supply system architecture to achieve uninterrupted power supply and improve the reliability of power consumption in data centers. As shown in FIG. 1, the data center system structure mainly includes two parts: UPS and communication devices. The UPS is provided with alternating current/direct current (AC/DC) conversion, direct current/alternating current (DC/AC) conversion and battery pack. Combined with the power distribution unit (PDU) outside the UPS, 380V high-voltage AC may be converted into 220V AC and output to the communication device, further converted into variable DC through power factor correction (PFC) and direct current/direct current (DC/DC, fixed DC voltage is converted into variable DC voltage) in the power supply unit (PSU) in the communication device, and may be output to the load of the motherboard of the communication device through variable resistor (VR) or directly.

The process of uninterruptible power supply of the data center server through UPS involves mains power conversion and charging and discharging of internal batteries. In the UPS power supply system, when the mains input is normal, the UPS filters and stabilizes the mains and supplies it to the power supply of the server in the data center, and charges the internal battery components of the UPS. When the mains input fails, the UPS will immediately convert the DC in the battery component into AC through the inverter to supply the power suppl of the server in the data center. In the above power supply system of the existing data center, AC/DC conversion and DC/AC conversion of the UPS are the main links of energy loss in the power transmission of the entire power supply system. The efficiency loss of each conversion between AC and DC is about 5%, and the converted AC also needs to be PFC to improve the power factor, which leads to an additional level of conversion loss. In the whole power supply process, the multiple losses of energy conversion lead to low power efficiency and large heat loss of the high-power servers in the data center. The UPS power supply is located in the main power path. The heat accumulation caused by high-power and long-term uninterrupted operation greatly increases the failure rate of the power supply, thereby seriously affecting the power reliability of the server in the data center. However, if a complex structure is added to the UPS to achieve redundant configuration of its power supply, the cost and volume of the power supply system in the data center power will be greatly increased.

One of the core creative points of the embodiment of the present application is to provide a simpler and more reliable power supply system and method of a server. Through the cooperative work of the main circuit structures such as the high-voltage battery power master control unit, the battery string control unit and the power conversion string control unit, real-time collection and analysis of power information of each subsystem in the power supply system is achieved. The high-voltage battery power master control unit may also issue corresponding control instructions to each subsystem according to the analysis results to realize power control of each subsystem, thereby controlling the total output power of the server. The whole main power supply path is simple and reliable, and it is not necessary to convert the high-voltage DC power supply on the input side into electric energy. The design structure between the high-voltage DC power supply inlet and the server power supply inlet is simplified, which may effectively improve the working efficiency of the power supply system and reduce heat loss. When the main power supply system outside the server operates abnormally, the power supply demand of the server may be ensured, and the conversion efficiency and working reliability of the power supply system may be ensured.

Figure 2:
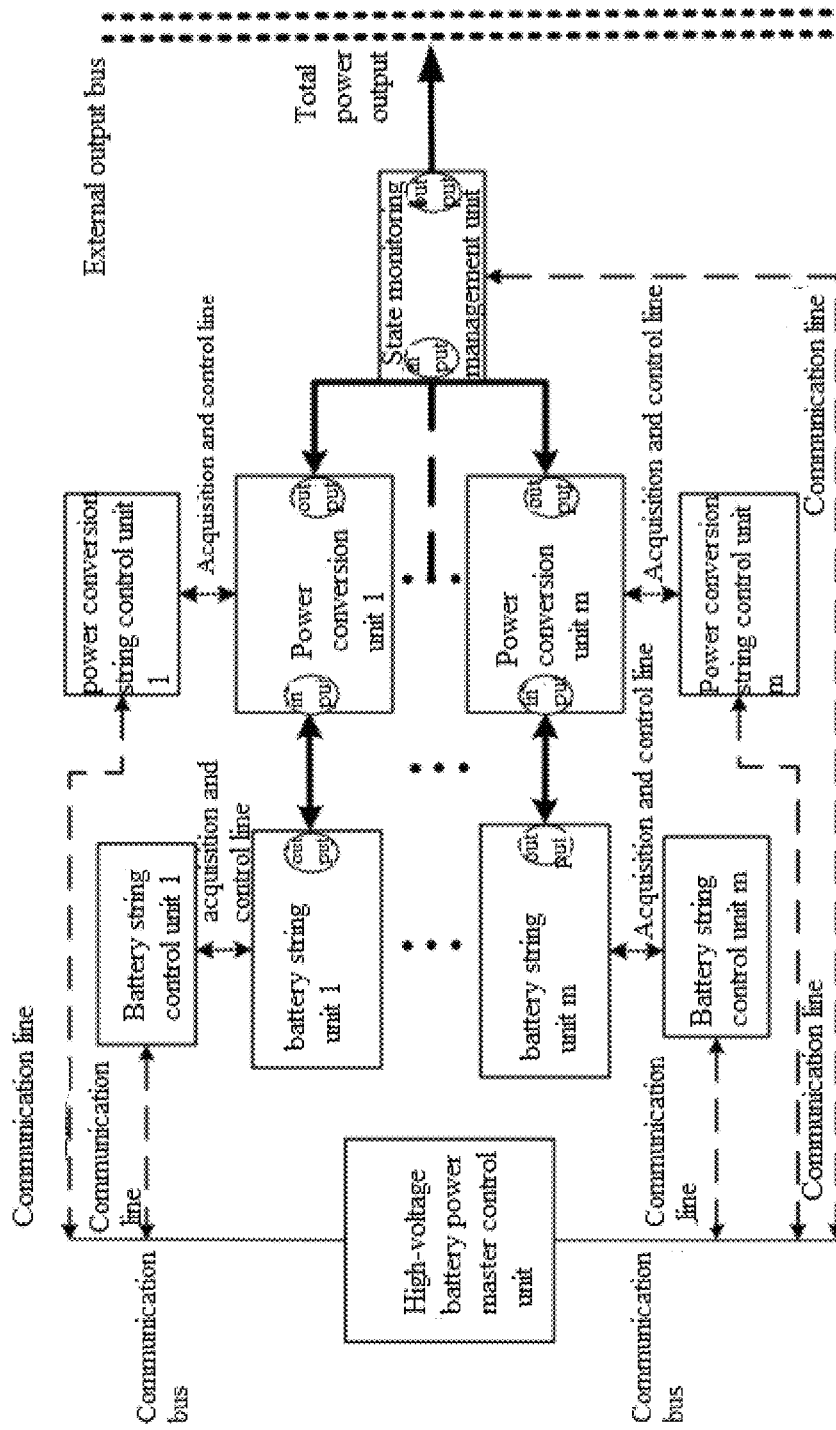
FIG. 2 is a circuit structure block diagram of a power supply module in a power supply system of a server according to an embodiment of the present application.

As shown in FIG. 2, a circuit structure block diagram of a power supply module in a power supply system of a server according to an embodiment of the present application is shown. The circuit structure block diagram may include:

a high-voltage battery power master control unit, at least one power conversion string control unit, at least one battery string control unit and a state monitoring management unit respectively connected to the high-voltage battery power master control unit, a power conversion unit connected to the power conversion string control unit, and a battery string unit connected to the battery string control unit, where each battery string unit is correspondingly connected to a power conversion unit, and each power conversion unit is connected in parallel and then connected to the state monitoring management unit.

It should be noted that for the convenience of explanation, only one of the power supply modules in the power supply system is given as an example in this embodiment. However, in fact, when the power supply system framework is designed, the entire power supply system not only includes one power supply module, but also use other power supply modules to charge and discharge with external output buses when one of the power supply modules fails, so as to achieve power supply backup redundancy for the server. It may be understood that the present application does not limit this.

The power supply module in the power supply system may include a high-voltage battery master control unit; m battery string units, namely battery string unit 1, battery string unit 2, and so on to battery string unit m; m power conversion units, namely power conversion unit 1, power conversion unit 2, and so on to power unit m; m battery string control units, namely battery string control unit 1, battery string control unit 2, and so on to battery string control unit m; m power conversion string control units, namely power conversion string control unit 1, power conversion string control unit 2, and so on to power conversion string control m.

An output of battery string unit 1 is connected to an input of power conversion unit 1, an output of battery string unit 2 is connected to an input of power conversion unit 2, and so on, an output of battery string unit m is connected to an input of power conversion unit m. The outputs of power conversion unit 1 to power conversion unit m are all connected in parallel. The common terminals connected in parallel are connected to an input of the state monitoring management unit, and an output of the state monitoring management unit is connected to a total power output port. The value of m is determined by the total power demand of the data center, the power supply of a single battery string unit, and the derating requirement value. As an example, the value of m may be 3, 4, 5, 6 or more. It may be understood that the present application does not limit this.

All battery string units may be connected to the battery string control unit through the acquisition and control line (battery string unit 1 is connected to the battery string control unit 1, and so on, battery string unit m is connected to the battery string control unit m), and all battery string control units (battery string control unit 1 to battery string control unit m) may be connected to the communication bus of the high-voltage battery power master control unit through the communication line.

Based on the above circuit connection, the control process of the battery string unit may be as follows: the battery string control unit may collect power information of the battery string unit that reflects the state of charge and the working state of charging and discharging of each battery cell in the battery pack in real time through the acquisition and control line, such as multiple voltage, current, and temperature signals, which may be multiple data values of the highest voltage of the battery cell, the lowest voltage of the battery cell, the total output voltage, the output current, and the highest temperature value and the lowest temperature value. Then, the health state of the battery string unit is analyzed by integrating multiple signals, and a state information table that may reflect the health state information of the battery string unit is generated based on the state analysis result, and sent to the high-voltage battery power master control unit. After receiving the state information table, the high-voltage battery power master control unit may compare the state information table with the predetermined total output data based on the total power supply output state, and further comprehensively determine the real health state of the battery string unit in combination with a voltage warning value of the battery cell in the battery pack, generate a switching control instruction and a power control instruction, send the switching control instruction to the battery string control unit. The battery string control unit further converts the switching control instruction into a switching control signal, and sends the switching control signal to the power switching tube in the battery string unit. The battery string unit may control the power switching tube in the battery string unit to switch to a switching state corresponding to the switching control signal, thereby controlling state regulation of each battery string unit in the whole battery pack by controlling the closed state of the power switching tube in different battery string units. The high-voltage battery power master control unit may send the power control instruction to the power conversion string control unit corresponding to the battery string control unit.

The state of charge (SOC) refers to a ratio of remaining capacity of a battery after it has been used for a period of time or has been unused for a long time to its capacity in a fully charged state. It is usually expressed as a percentage, and its value range is 0 to 1. When SOC=0, it means that the battery is fully discharged, and when SOC=1, it means that the battery is fully charged.

All power conversion units may be connected to the power conversion string control unit through the acquisition and control line (the power conversion unit 1 is connected to the power conversion string control unit 1, and so on, the power conversion unit m is connected to the power conversion string control unit m). The power conversion unit (power conversion unit 1 to power conversion unit m) is bidirectional power conversion unit. Voltage and current signals of the input and output sides of the power conversion unit, as well as temperature signals of the key power hot spots may be transmitted to the power conversion string control unit through the acquisition and control line. The main control chip in the power conversion string control unit may calculate and process the collected voltage, current, and temperature data information of the power conversion unit to form the health state information of the power conversion unit. The power conversion string control unit may transmit the control signal to the power switching tube in the power conversion unit through the acquisition and control line, so as to realize the voltage and current conversion function between different inputs and outputs of the power conversion unit by controlling different transient switching states of the power switching tube in the power conversion unit.

The state monitoring management unit may be connected to the communication bus of the high-voltage battery power control unit through a communication line. The state monitoring management unit includes total output voltage detection, total current detection, and an output switch. The output switch is configured to receive a control instruction sent from the high-voltage battery power control unit.

All power conversion string control units (power conversion string control unit 1 to power conversion string control unit m) may be connected to the communication bus of the high-voltage battery power master control unit through a communication line. The high-voltage battery master control unit may collect data information from each battery string control unit and the state monitoring management unit through the communication bus. The comprehensive processing chip of the high-voltage battery power master control unit, such as micro controller unit (MCU) and digital signal processing (DSP), may further send a power control instruction to the power conversion string control unit through the communication bus after analyzing and processing the received data information, so that the power conversion string control unit acquires the input voltage, the input current, the output voltage and the output current state that need to be completed, and the power conversion string control unit may convert the received power control instruction into a power control signal, and send the power control signal to the power conversion unit. The power conversion unit may perform a voltage acquisition operation corresponding to the power control signal, acquire a corresponding output voltage from the battery string unit corresponding to the power conversion unit, and adjust the output voltage from a first predetermined voltage range to a second predetermined voltage range. The second predetermined voltage range is within the first predetermined voltage range, that is, the output voltage with large fluctuation of the battery string unit may be adjusted to an output voltage with higher precision to achieve voltage stabilization output, and the adjusted output voltage is transmitted to the state monitoring management unit. The state monitoring management unit may acquire the current in each battery string unit, calculate the total output power based on the current and the adjusted output voltage, and output the total output power to the server through the high-voltage battery power master control unit. The high-voltage battery power master control unit may be configured to receive the total output power sent by the state monitoring management unit through the communication bus, and control the power supply module in the power supply system to output the total output power to the server as a total power output value of the server, or control the power supply module in the power supply system to output a predetermined total power output value to the server as the total power output value of the server.

It should be noted that different power conversion string control units here may have the same input voltage, input current, output voltage, and output current states, or may have different input voltage, input current, output voltage, and output current states.

The output of the battery string unit and the input of the corresponding power conversion unit are connected in series. If a faulty battery string unit is detected, the power conversion unit may also allocate power to battery string units other than the faulty battery string unit based on a predetermined power threshold. The output voltage of the battery cell in the battery string unit corresponding to the power conversion unit may be adjusted from the first predetermined voltage range to the second predetermined voltage range by controlling the input voltage state and output voltage state of the power conversion unit, where the second predetermined voltage range is within the first predetermined voltage range, so that the wide range output voltage precision of each battery cell in the battery string unit may be converted into a high-precision output voltage, and the high-precision voltages output by a total of m power conversion units (1 to m) are connected in parallel to provide a total output power. If one or more power conversion units are abnormal, the total voltage will be output to each battery string unit to determine the power bearing capacity of each corresponding power conversion unit, and the remaining m value will be reallocated to the power bearing capacity of the power conversion units with normal functions.

The voltage on the input side of the power conversion unit is determined by the output voltage of the battery string units connected in series, while the power state (including voltage and current values) on the output side of the power conversion unit is controlled by the corresponding power conversion string control unit. The specific power output value controlled by the corresponding power conversion string control unit is determined by the power control instruction sent by the high-voltage battery power master control unit. The high-voltage battery power master control unit may send specific output power values to m power conversion string control units after comprehensive determination based on the collected state information values of each battery string unit, and values of the power output executed by each power conversion string control unit may be the same or different.

The above comprehensive determination process for the state information value of each battery string unit is mainly as follows: determining whether an abnormal battery cell is present in each battery string unit, and compare the total output voltage of the battery string unit with the abnormal cell with the average value of total voltage of all remaining battery string units. If the comparison result indicates that there is a large difference between the total output voltage values, it is necessary to reduce the power borne by the battery string unit with the abnormal cell, and reallocate the power based on the total output voltage. In addition, when the number of abnormal cells in a certain battery string unit is large and the number of closed power switching tubes is large, it is necessary to monitor the battery string unit to further determine whether there is a faulty battery string unit.

The outputs of m power conversion units are connected in parallel, and voltage conversion may be performed between any two power conversion units to realize the charging and discharging relationship between different battery string units, such as battery string unit 1, battery string unit 2 or battery string unit m. Charging and discharging may be performed between any two battery string units. The high-voltage battery power master control unit may send a voltage conversion instruction to the power conversion string control unit. The power conversion string control unit may receive the voltage conversion instruction sent by the high-voltage battery power master control unit and execute the voltage conversion instruction to control the voltage conversion between power conversion units corresponding to the voltage conversion instruction. Which two battery string units are charged and discharged, as well as the voltage and current values of charging and discharging, are determined by the high-voltage battery power master control unit by collecting the data information of each battery string control unit and performing data processing.

The power borne by a branch of each battery string unit may be determined based on the health state information of each battery string unit transmitted from the battery string control unit to the high-voltage battery power control unit, and the health state information of each power conversion unit transmitted from the power conversion string control unit to the high-voltage battery power control unit.

If each battery string unit and each power conversion unit are in good condition, such as the power information of each battery string unit meets the predetermined power condition, the high-voltage battery power master control unit may send the total output power or the predetermined total power output value to each battery string control unit in the form of a control instruction, to achieve equal reallocation for each battery string unit.

If there is an abnormal battery string unit whose power information does not meet the predetermined power condition, for example, the health state of battery string units and power conversion unit in a branch of the battery string unit is abnormal, such as low voltage of the battery cell in the battery string unit or high temperature of power switching tube, the power of the abnormal battery string unit is determined based on the predetermined derating output power, and the power corresponding to remaining battery string units that meet the predetermined power condition is calculated based on the total output power, or the predetermined total power output value, and the power of the abnormal battery string unit. If the power of the abnormal battery string unit is reduced to 80% of the average output power, the remaining branches will bear the remaining power on average.

If the power information of the adjusted battery string unit still does not meet the predetermined power condition, for example, the adjusted battery string unit still has the abnormal health state, the corresponding battery string control unit may acquire a shutdown control instruction sent by the high-voltage battery power master control unit, and execute the shutdown operation corresponding to the shutdown control instruction to shut down the power output of the adjusted battery string unit. The data center operator may be informed through the communication bus or panel abnormal display to perform maintenance in time.

The predetermined power condition may be that the voltage/current of each battery string unit and each power conversion unit is stable and does not exceed a threshold. The peak voltage, the minimum voltage, the maximum discharge current and charging current of each battery cell in each battery string unit all have standard values. These standard values may be predetermined as thresholds, and then a critical threshold may be set as an early warning value.

The voltage difference between any two battery string units may be evaluated by the high-voltage battery power master control unit. The output power of each battery string unit may be analyzed based on the state information table and the predetermined output power, and the voltage difference between any two battery string units may be determined based on the analysis result. The voltage difference between the two battery string units with a voltage difference is then compared with a first predetermined voltage difference threshold. When the voltage difference is greater than or equal to the first predetermined voltage difference threshold, it indicates that the voltage difference between the two battery string units is large. A discharge control instruction may be sent to the power conversion string control unit corresponding to the relatively high-voltage battery string unit to control the relatively high-voltage battery string unit to discharge the relatively low-voltage battery string unit. The voltage difference between battery string units is mainly obtained by comparing and analyzing the total output voltage of the battery pack and the output current value, the average output voltage, the maximum output voltage and the minimum output voltage of each battery string unit. It should be noted that the relatively high-voltage battery string unit here refers to a battery string unit with a higher voltage compared with another battery string unit. Similarly, the relatively low-voltage battery string unit refers to a battery string unit with a lower voltage compared with another battery string unit. It should be understood that the present application does dot limit this.

Furthermore, if there is a first battery cell with a discharge value greater than or equal to a predetermined discharge threshold in the relatively high-voltage battery string unit, it means that the discharge amount of the first battery cell is too large and it is not suitable to discharge more in a short period of time to avoid damage to the device caused by over-discharging. A bypass control instruction may be sent to the relatively high-voltage battery string unit through the high-voltage battery power master control unit, or the battery string control unit corresponding to the relatively high-voltage battery string unit, to control the relatively high-voltage battery string unit to bypass the first battery cell.

If there is a second battery cell with a charging value greater than or equal to a predetermined charging threshold in a relatively low-voltage battery string unit, it means that the discharge amount of the second battery cell is too large and it is not suitable to charge more in a short period of time to avoid damage to the device caused by overcharging. A bypass control instruction may be sent to the relatively low-voltage battery string unit through the high-voltage battery power master control unit or the battery string control unit corresponding to the relatively low-voltage battery string unit, to control the relatively low-voltage battery string unit to bypass the second battery cell.

When the battery string unit is discharged, there may be two battery cells with a large voltage difference in the same battery string unit or between any two battery string units, for example, the voltage of one battery cell is 4V and the voltage of the other battery cell is 2V, the two battery cells are discharged at the same time. When the voltage difference between the two battery cells is greater than a predetermined value, such as greater than 5 mV, the 2V low-voltage battery cell needs to be bypassed first, and the 4V high-voltage battery cell needs to be discharged first. When the voltage difference between the discharged high-voltage battery cell and the low-voltage battery cell is less than 5 mV, the bypass state of the low-voltage battery cell is released, so that the two battery cells may be discharged at the same time. In a specific implementation, if it is detected that the high-voltage battery cell and the low-voltage battery cell with a voltage difference greater than or equal to a second predetermined voltage difference threshold are discharging at the same time, a bypass control instruction may be sent to the battery string unit corresponding to the low-voltage battery cell through the high-voltage battery power master control unit to control the bypass of the low-voltage battery cell. After the high-voltage battery cell has been discharged for a period of time, if it is detected that the voltage difference between the high-voltage battery cell and the low-voltage battery cell is less than the second predetermined voltage difference threshold, the bypass state of the low-voltage battery cell may be released by the high-voltage battery power master control unit, so that the high-voltage battery cell and the low-voltage battery cell may be discharged at the same time.

When it is detected that the health state of any battery cell in a certain battery string unit is abnormal, such as overcharging and over discharging faults, the high-voltage battery power master control unit or the corresponding battery string control unit may send a control instruction to control the power switching tubes connected in parallel with the battery cell in the battery string unit to be turned on and bypass the battery cell, so that the battery cell exit the working state. If an abnormal battery cell with abnormal charging and discharging is detected in any battery string unit, a bypass control instruction may be sent to the abnormal battery string unit corresponding to the abnormal battery cell through the high-voltage battery power master control unit, to control the abnormal battery string unit to bypass the abnormal battery cell.

After the abnormal battery cell in the abnormal battery string unit is bypassed, when the abnormal battery string unit is in a discharging state, the high-voltage battery power master control unit may adjust the input voltage and output voltage state of the power conversion unit connected in series with the branches of the battery string unit and the power distribution situation of different branches of the battery string unit branches in the above power distribution method according to the health state of the abnormal battery cell in the abnormal battery string unit and the health state of other battery string units. If a battery cell failure continues to occur during the power distribution process, the process is repeated.

A battery string unit in which any bypass battery cell is present may be determined as a bypass battery string unit. If the bypass battery string unit is in a discharging state, the health state of the bypassed battery cell and the health state of other battery string units in the bypass battery string unit may be analyzed by the high-voltage battery power master control unit. Based on the analysis result, the power distribution of the bypass battery string unit is adjusted using the total output power. If the bypass battery string unit is in a charging state, the power conversion unit corresponding to the bypass battery string unit is controlled to continue charging a third battery cell with a charging value less than a predetermined charging threshold in the bypass battery string unit. When the charging value of the third battery cell is greater than or equal to the predetermined charging threshold, the third battery cell is controlled to be bypassed, so that all battery cells can maintain a good charging and discharging state.

When the battery string unit corresponding to the bypassed battery cell enters the next working state or a working state meeting the criterion preset in the high-voltage battery power control unit, for example, when the charging state of the battery cell voltage reaches the average voltage value of the battery cell in the battery string unit, the power switching tube is turned off, so that the bypassed battery cell may continue to work. That is, if it is detected that the bypassed battery string unit meets the predetermined charging state, the power switching tube of the bypassed battery string unit may be controlled by the high-voltage battery power control unit to be turned off, so as to release the bypass state of the bypassed battery cell.

When the input side voltage of the power conversion unit (i.e., the output side voltage of the battery string unit) is low, it means that the battery string unit needs to be charged. The high-voltage battery power master control unit may send an instruction to the power conversion string control unit. The power conversion string control unit controls the opening and closing states of the power switching tube of the power conversion unit through the acquisition and control line, thereby realizing the charging of the battery string unit by the output bus.

If it is detected that the voltage of the power conversion unit is lower than the predetermined voltage threshold, the high-voltage battery power master control unit may send a charging control instruction to the power conversion string control unit corresponding to the power conversion unit, so that the power conversion string control unit executes the charging control instruction and controls the opening and closing state of the power switching tube of the power conversion unit, so as to control the charging of the battery string unit corresponding to the power conversion unit.

Figure 3:
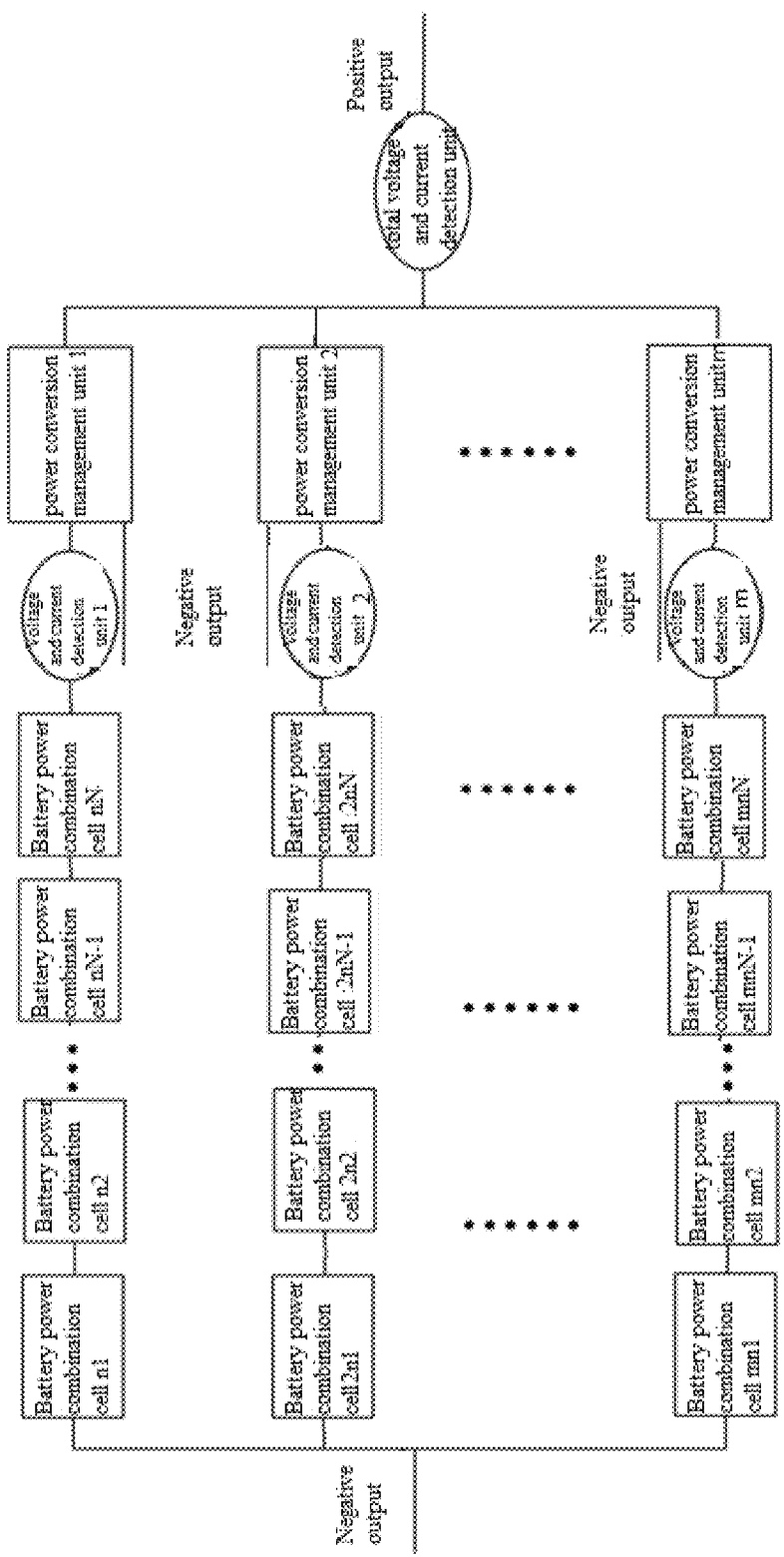
FIG. 3 is a circuit structure block diagram of a power unit of an integrated battery pack according to an embodiment of the present application.

In some embodiments, the power supply module in the power supply system includes an overall battery pack power unit. As shown in FIG. 3, a circuit structure block diagram of an integral battery pack power unit according to an embodiment of the present application is shown. The circuit structure block diagram may include:

a total voltage and current detection unit, at least one power conversion management unit connected in parallel with the total voltage and current detection unit, a voltage and current detection unit connected to the power conversion management unit, and a battery string unit connected to the voltage and current detection unit, where each power conversion management unit is connected to a voltage and current detection unit, each power conversion management unit includes a power conversion unit and a corresponding power conversion string control unit, and each battery string unit includes a plurality of battery power combination cells connected in series.

The total voltage and current detection unit is connected to a positive output of the power supply, the total voltage and current detection unit is connected to a common terminal connected in parallel with each power conversion management unit, each power conversion management unit is connected in series with each voltage and current detection unit, each voltage and current detection unit is connected in series with the output terminal of each battery string unit, and the common terminal connected in parallel with each battery string unit is connected to a negative output of the power supply. That is, the overall battery power unit may be regarded as being composed of N battery power combination cells connected in series and then in parallel. The number of parallel connections is m, where specific values of N and m are determined based on the power requirements and derating requirements of the whole data center application.

As an example, a positive electrode of the battery power combination cell n1 is connected in series with a negative electrode of the battery power combination cell n2, and so on, and a negative electrode of the battery power combination cell nN−1. A positive electrode of the battery power combination cell nN−1 is connected in series with a negative electrode of the battery power combination cell nN, and a positive electrode of the battery power combination cell nN is connected in series with the voltage and current detection unit 1 and then connected in series with the power conversion management unit 1.

A positive electrode of the battery power combination cell 2n1 is connected in series with a negative electrode of the battery power combination cell 2n2, and so on, and a negative electrode of the battery power combination cell 2nN−1. A positive electrode of the battery power combination cell 2nN−1 is connected in series with a negative electrode of the battery power combination cell 2nN, and the positive electrode of the battery power combination cell 2nN is connected in series with the voltage and current detection unit 2 and then connected in series with the power conversion management unit 2.

By analogy, a positive electrode of the battery power combination cell mn1 is connected in series with a negative electrode of the battery power combination cell mn2, and so on, and a negative electrode of the battery power combination cell mnN−1. A positive electrode of the battery power combination cell mnN−1 is connected in series with a negative electrode of the battery power combination cell mnN, and a positive electrode of the battery power combination cell mnN is connected in series with the voltage and current detection unit m and then connected in series with the power conversion management unit m.

A negative electrode of the battery power combination cell n1, a negative electrode of the battery power combination cell 2n1, and so on, a negative electrode of the battery power combination cell mn1 are connected in parallel to form the output negative electrode of the overall battery pack power unit.

The output side of the power conversion management unit 1 and the output side of the power conversion management unit 2, and so on, and the output side of the power conversion management unit m are connected in parallel, and then connected to the total voltage and current detection unit to form the output positive electrode of the overall battery pack power unit.

The voltage and current detection unit may be configured to detect the voltage and current information of a series branch including N battery power combination cells. The total voltage and current detection unit may be configured to detect the total voltage and current information of m series branches connected in parallel. The voltage and current information is finally sent to the high-voltage battery power master control unit through their respective communication buses for comprehensive data processing, battery charging and discharging control and energy flow safety control, etc. The high-voltage battery power master control unit may be configured to receive the total voltage and current information and the individual voltage and current information to control the charging and discharging of each battery string unit.

Figure 4:
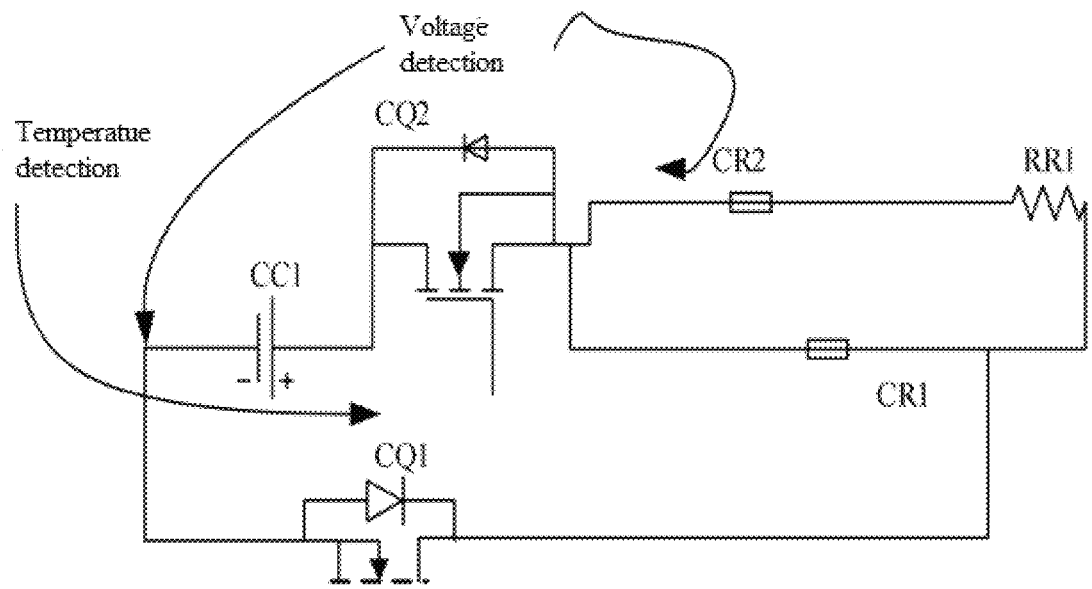
FIG. 4 is a circuit structure block diagram of a battery power combination cell according to an embodiment of the present application.

In some embodiments, each battery string unit includes a plurality of battery power combination cells. As shown in FIG. 4, a circuit structure block diagram of a battery power combination cell according to an embodiment of the present application is shown. The circuit structure block diagram may include:

a battery cell CC1, a power switching tube CQ1 and a power switching tube CQ2 connected to the battery cell CC1, a fuse CR1 and a fuse CR2 connected to the power switching tube CQ2, and an impedance matching resistor RR1 connected to the fuse CR2, where the fuse CR2 is connected in series with the impedance matching resistor RR1 and then connected in parallel with the fuse CR1.

A positive electrode of the battery cell CC1 is connected to a drain of the power switching tube CQ2, a source of the power switching tube CQ2 in the battery string unit is connected to one end of the fuse CR1, the other end of the fuse CR1 in the battery string unit is connected to a drain of the power switching tube CQ1, a source of the power switching tube CQ1 in the battery string unit is connected to a negative electrode of the battery cell CC1 in the battery string unit, and the fuse CR2 is connected in series with the impedance matching resistor RR1 and then connected in parallel with the fuse CR1 in the battery string unit.

The power switching tube CQ1 and the power switching tube CQ2 are respectively connected to the battery string control unit corresponding to the battery power combination cell. A gate of the power switching tube CQ1 and a gate of the power switching tube CQ2 are respectively connected to the battery string control unit corresponding to the battery string unit to which the battery power combination cell belongs. The battery string control unit may control the turn-on and turn-off of the power switching tube to achieve fault isolation of the battery cell. The power switching tube CQ1 and the power switching tube CQ2 are in a complementary turn-on and turn-off relationship.

A voltage monitoring point is provided between a drain and a source of the power switching tube CQ1, and a temperature collection point is provided at the power integration of the power switching tube CQ1 and the battery cell CC1. The battery string control unit may collect voltage information of the voltage monitoring point and temperature information of the temperature monitoring point through the acquisition and control line.

The battery cell CC1 is a main carrier of output energy. The fuse CR1 is configured to control an abnormal high-current discharging fault of a branch corresponding to the battery cell. A series branch of the fuse CR2 and the impedance matching resistor RR1 is configured to control to correct a mistakenly fused branch corresponding to the fuse CR1 to be turned on. When the battery cell CC1 has an overcurrent abnormality, and the battery cell CC1 branch is turned off, sufficient response time is provided for turn-off of the power switching tube CQ1.

By adjusting a ratio between the impedance matching resistor RR1 and the fuse CR2, such as setting the ratio between the impedance matching resistor RR1 and the fuse CR2 between 20 times and 100 times, the fusing capacity may be controlled and the on-resistance loss may be appropriately reduced. Since the impedance matching resistor is present in a branch of the fuse CR2, when the circuit works normally, the current flows through the branch of the fuse CR1, thereby reducing the on-resistance loss.

In the circuit structure of the above battery power combination cell, the power switching tube CQ2 is introduced in the battery power combination cell, and CQ1 and CQ2 are complementary to each other, so that two fuses are provided only to provide an additional limit protection function for the battery, but from the overall point of view, the volume will increase. From the circuit structure point of view, even if the two fuses are removed, the turn-off of the power switching tube will not be affected.

In some embodiments, the fuse CR2 and the impedance matching resistor RR1 branch may be removed, and the fuse CR1 may also be removed, so that the battery cell CC1 is directly connected in series with the power switching tube CQ1 and the power switching tube CQ2, thereby improving the functional density, reducing duty volume, optimizing the circuit, and reducing the cost of the power supply system.

Figure 5:
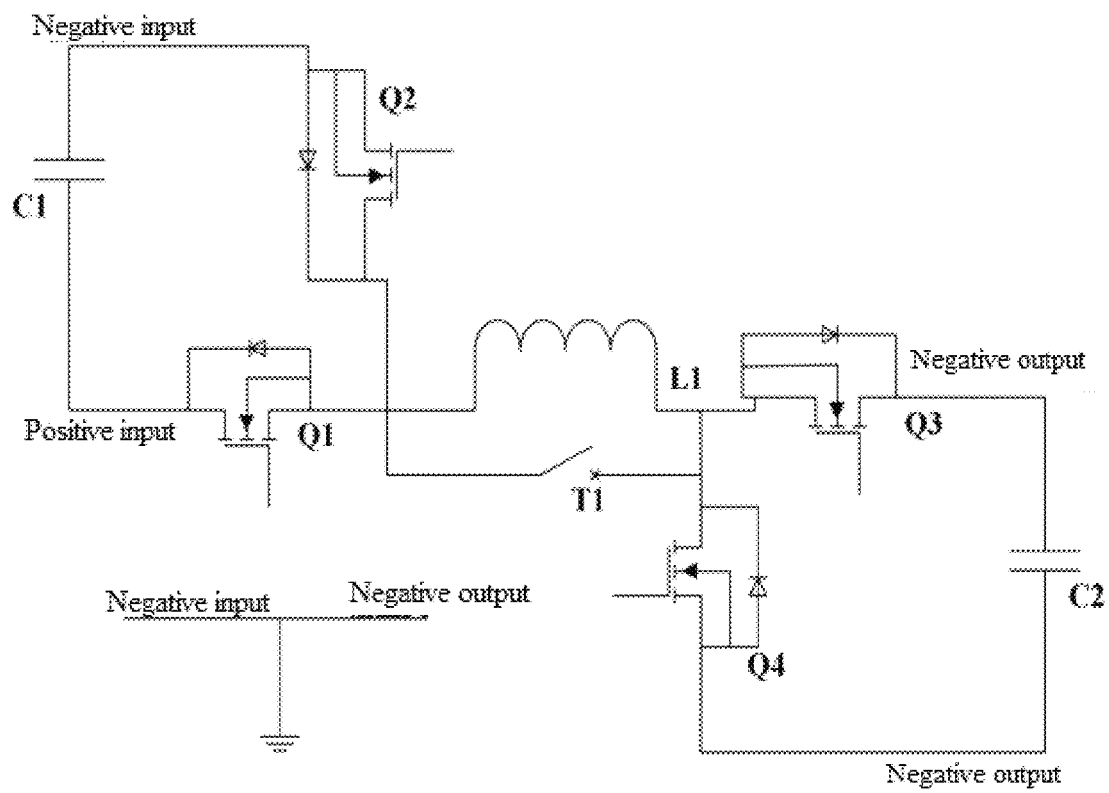
FIG. 5 is a circuit structure block diagram of a power conversion unit according to an embodiment of the present application.

In some embodiments, as shown in FIG. 5, a circuit structure block diagram of a power conversion unit according to an embodiment of the present application is shown. The circuit structure block diagram may include:
- a capacitor C1, a power switching tube Q1 and a power switching tube Q2 connected to the capacitor C1, an energy storage inductor L1 connected to the power switching tube Q2, a power switching tube Q3 and a power switching tube Q4 connected to the energy storage inductor L1, and a capacitor C2 connected to the power switching tube Q4, where a relay T1 is connected in parallel at both ends of the energy storage inductor L1.

The capacitor C1 may be connected in parallel between the positive input and the negative input of the power supply. The positive power input is connected to a drain of the power switching tube Q1, a source of the power switching tube Q1 is connected to a drain of the power switching tube Q2, a source of the power switching tube Q2 is connected to the negative input of the power supply, a source of the power switching tube Q1 is connected to one end of the energy storage inductor L1, and the other end of the energy storage inductor L1 is connected to a drain of the power switching tube Q3, the energy storage inductor L1 is connected in parallel with the relay T1, a source of the power switching tube Q3 is connected to the positive output of the power supply, the capacitor C2 is connected in parallel between the positive output and the negative output of the power supply, the negative output of the power supply is connected to a source of the power switching tube Q4, a drain of the power switching tube Q4 is connected to a source of the power switching tube Q3, and the negative input and the negative output of the power supply are commonly grounded.

The gates of the power switching tubes Q1 to Q4 may be connected to a power conversion string control unit corresponding to the power conversion unit, and the control terminal of the relay T1 may be connected to the power conversion string control unit through the acquisition and control line. The power switching tubes Q1 to Q4 and the relay T1 may be controlled to be turned on and off through the power conversion string control unit. The power switching tubes Q1 to Q4 are high-frequency controlled, and the control frequency may be as low as several hundred kilohertz (KHz) and as high as megahertz (MHZ). The relay T1 is low-frequency controlled, with a maximum of 1 KHz.

The power supply system may include an external output bus. When the external output bus charges the battery string unit through the power conversion unit, if the voltage of the external output bus is higher than the voltage of the battery string unit, the power conversion string control unit may control the relay T1 to be turned off, control the power switching tube Q1 to be constantly turned on, control the power switching tube Q2 to be constantly turned off, and control the power switching tube Q3 and the power switching tube Q4 to be alternately turned on in high-frequency switching control, and adjust the power conversion unit to a buck topology structure, so as to realize charging of the battery string unit in constant current first and then in constant voltage. When the external output bus charges multiple battery string units, the topology structure may be adjusted to a buck topology by controlling turn-on and turn-off of relays and power switches to achieve multi-stage buck during the charging of the battery string units. For example, the voltage provided by the external output bus may be 500V, and the voltage that the battery string unit may withstand is 180V. The 500V may be first bucked to 220V, and then to 180V, and then the two-stage bucked 180V voltage is transmitted to the battery string unit to ensure the normal operation of the battery string unit.

If the voltage of the external output bus is lower than the voltage of the battery string unit, the power conversion string control unit may control the relay T1 to be turned off, control the power switching tube Q3 to be constantly turned on, and control the power switching tube Q4 to be constantly turned off. The power switching tube Q1 and the power switching tube Q2 are controlled to be alternately turned on by high-frequency switching control, and the power conversion unit is adjusted to a boost topology structure, thereby realizing charging of the battery string unit in constant current first and then in constant voltage. Similarly, if the voltage of the external output bus is lower than the voltage of the battery string unit, in order to improve the voltage transmission efficiency, the topology structure may be adjusted to a boost topology structure by controlling turn-on and turn-off of the relay and the power switching tube to realize the boost during the charging of the battery string unit. For example, the voltage provided by the external output bus may be 180V, and the voltage of the battery string unit is 220V. The 180V may be boosted to 220V by the above method, and then the 220V voltage is transmitted to the battery string unit.

When the battery string unit discharges the external output bus through the power conversion unit, if the voltage of the external output bus is higher than the voltage of the battery string unit, the power conversion string control unit may control the relay T1 to be turned off, control the power switching tube Q1 to be constantly turned on, and control the power switching tube Q2 to be constantly turned off. The power switching tubes Q3 and Q4 are controlled to be alternately turned on by high-frequency switching control, and the power conversion unit is adjusted to a boost topology structure, thereby realizing constant-voltage discharge of the external output bus in constant voltage mode.

When the voltage of the external output bus is lower than the voltage of the battery string unit, the power conversion string control unit may control the relay T1 to be turned off, control the power switching tube Q3 to be constantly turned on, and control the power switching tube Q4 to be constantly turned off. The power switching tube Q1 and the power switching tube Q2 are controlled to be alternately turned on by high-frequency switching control, and the power conversion unit is adjusted to a buck topology structure, thereby realizing constant-voltage discharge of the external output bus in buck mode.

The power conversion string control unit may control the power switches Q1 to Q4 and the relay T1 to achieve charging and discharging balanced control between the two battery string units, for example, to achieve mutual charging and discharging between the battery string unit 1 and the battery string unit 2. When balanced control of battery cell is performed, the power switches Q1 and Q3 in the power conversion unit 1 may be controlled to be constantly turned on, Q2 and Q4 may be controlled to be constantly turned off, and the relay T1 may be controlled to be turned off. Based on the voltage relationship between the battery string unit 1 and the battery string unit 2, the switching state of the power conversion unit 2 is controlled by the above topology structure control conversion to achieve charging and discharging between the battery string unit 1 and the battery string unit 2.

In a specific implementation, if a first target battery string unit and a second target battery string unit that are required to be charged and discharged with each other are present, the switching state of the power conversion unit corresponding to the first target battery string unit may be controlled by the power conversion string control unit corresponding to the first target battery string unit, and the switching state of the power conversion unit corresponding to the second target battery string unit may be controlled by the power conversion string control unit corresponding to the second target battery string unit, and the topology structure corresponding to the power conversion unit may be adjusted. The adjustment of the specific topology structure has been described in detail before and will not be described herein.

When a large number of battery power combination cells in the battery string unit are bypassed by an internal power switching tube, the voltage difference between the battery string unit 1 and the battery string unit 2 is too large (for example, when the required conversion voltage difference exceeds the single-stage conversion capacity, the voltage difference is considered to be too large, and the single-stage conversion capacity is evaluated based on the initial design of the circuit, and the evaluation value may be written into the control instruction as a third predetermined voltage difference threshold as an evaluation criterion). The switching state of the power conversion unit 1 may be first controlled by the above topology structure control conversion to increase or decrease its output voltage, so as to reduce the voltage difference between the battery string unit 1 and the battery string unit 2, for example, so as to reduce the voltage difference between the two battery cells to between 10 and 50 mv. The switching state of the power conversion unit 2 may be further controlled by the above topology structure control conversion to control the charging and discharging between the battery string unit 1 and the battery string unit 2, so as to achieve directional balanced control of a small number of battery cells in the battery string unit.

In a specific implementation, when a voltage difference between the first target battery string unit and the second target battery string unit is greater than a third predetermined voltage difference threshold, the power conversion string control unit corresponding to the first target battery string unit may be configured to: control the switching state of the power conversion unit corresponding to the first target battery string unit, so as to reduce the voltage difference between the first target battery string unit and the second target battery string unit.

The power conversion string control unit corresponding to the second target battery string unit may be configured to: control the switching state of the power conversion unit corresponding to the second target battery string unit, and adjust the topology structure corresponding to the power conversion unit, so as to control charging and discharging between the first target battery string unit and the second target battery string unit.

It should be noted that the embodiments of the present application include but are not limited to the above examples. It may be understood that those skilled in the art may also make settings according to actual needs under the guidance of the ideas of the embodiments of the present application, and the present application does not limit this.

In an embodiment of the present application, a power supply system of a server is provided. Through the cooperative work of the main circuit structures such as the high-voltage battery power master control unit, the battery string control unit and the power conversion string control unit, real-time collection and analysis of power information of each subsystem in the power supply system is achieved. The high-voltage battery power master control unit may also issue corresponding control instructions to each subsystem according to the analysis results to realize power control of each subsystem, thereby controlling the total output power of the server. The whole main power supply path is simple and reliable, and it is not necessary to convert the high-voltage DC power supply on the input side into electric energy. The design structure between the high-voltage DC power supply inlet and the server power supply inlet is simplified, which may effectively improve the working efficiency of the power supply system and reduce heat loss. When the main power supply system outside the server operates abnormally, the power supply demand of the server may be ensured, and the conversion efficiency and working reliability of the power supply system may be ensured.

Figure 6:
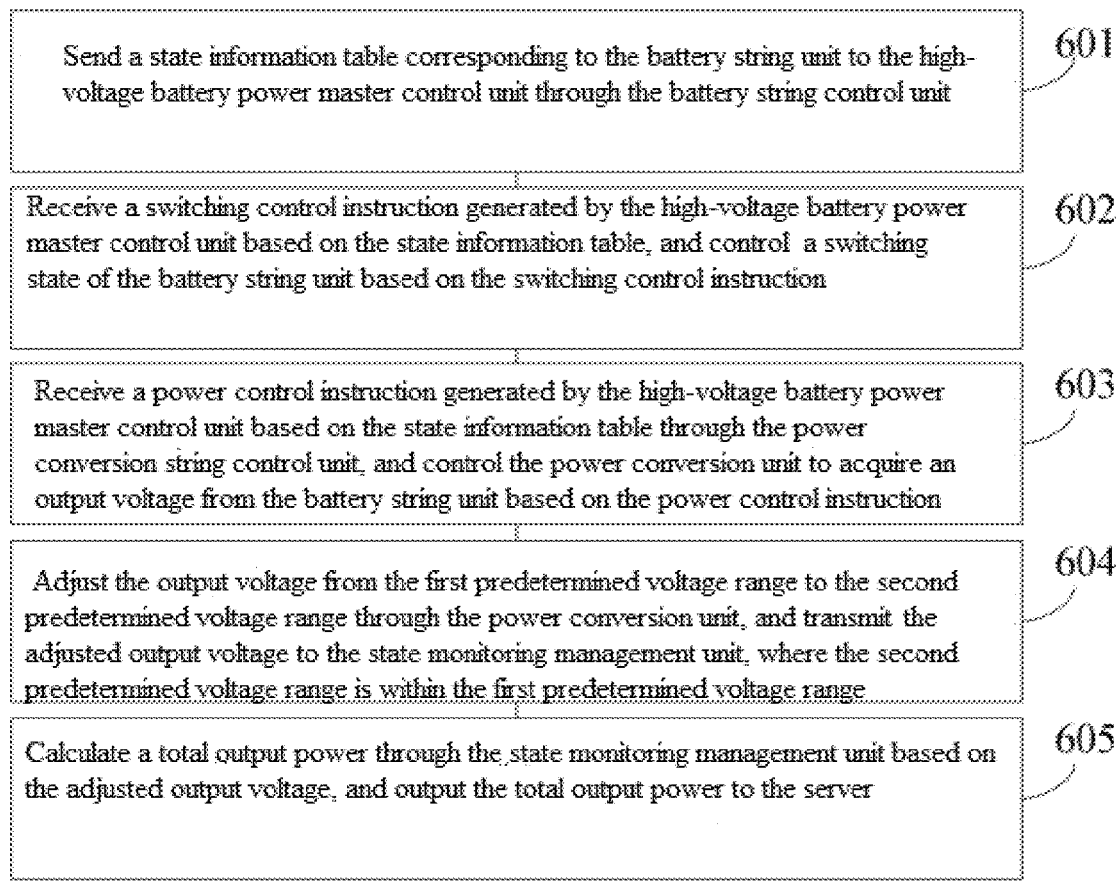
FIG. 6 is a flowchart of a power supply method of a server according to an embodiment of the present application.

As shown in FIG. 6, a flowchart of steps of a power supply method of a server according to an embodiment of the present application is shown. The method is applied to a power supply system of the server. The power supply system includes at least one power supply module, the power supply module includes at least a high-voltage battery power master control unit, at least one power conversion string control unit, at least one battery string control unit and a state monitoring management unit respectively connected to the high-voltage battery power master control unit, a power conversion unit connected to the power conversion string control unit, and a battery string unit connected to the battery string control unit. Each battery string unit is connected to a power conversion unit, and various power conversion units are connected in parallel and then connected to the state monitoring management unit. The method may include the following steps:

step 601: sending a state information table corresponding to the battery string unit to the high-voltage battery power master control unit through the battery string control unit;

step 602: receiving a switching control instruction generated by the high-voltage battery power master control unit based on the state information table, and controlling a switching state of the battery string unit based on the switching control instruction;

step 603: receiving a power control instruction generated by the high-voltage battery power master control unit based on the state information table through the power conversion string control unit, and controlling the power conversion unit to acquire an output voltage from the battery string unit based on the power control instruction;

step 604: adjusting the output voltage from the first predetermined voltage range to the second predetermined voltage range through the power conversion unit, and transmitting the adjusted output voltage to the state monitoring management unit, where the second predetermined voltage range is within the first predetermined voltage range; and step 605: calculating a total output power through the state monitoring management unit based on the adjusted output voltage, and outputting the total output power to the server.

In some embodiments, the method further includes: collecting power information of the battery string unit through the battery string control unit, and analyzing a health state of the battery string unit using the power information, to generate a state information table corresponding to the battery string unit.

In some embodiments, the power information includes a variety of voltage, current and temperature signals in the battery string unit. The collecting power information of the battery string unit through the battery string control unit, and analyzing a health state of the battery string unit using the power information, to generate a state information table corresponding to the battery string unit, includes:

collecting various voltage, current and temperature signals of the battery string units through the battery string control unit, and analyzing the health state of the battery string unit using the various voltage, current and temperature signals, to generate the state information table. In some embodiments, the method further includes:

receiving the state information table sent by the battery string control unit through the high-voltage battery power master control unit, comparing the state information table with predetermined total output data, generating a switching control instruction and a power control instruction, sending the switching control instruction to the battery string control unit, and sending the power control instruction to the power conversion string control unit corresponding to the battery string control unit.

In some embodiments, controlling the switching state of the battery string unit based on the switching control instruction includes:

converting the switching control instruction into a switching control signal through the battery string control unit, and sending the switching control signal to the battery string unit;

controlling a power switching tube in the battery string unit to switch to a switching state corresponding to the switching control signal through the battery string unit.

In some embodiments, controlling the power conversion unit to acquire the output voltage from the battery string unit based on the power control instruction includes:

converting the power control instruction into a power control signal through the power conversion string control unit, and sending the power control signal to the power conversion unit; and performing a voltage acquisition operation corresponding to the power control signal by the power conversion unit, to acquire an output voltage from the battery string unit corresponding to the power conversion unit.

In some embodiments, the method further includes: allocating power to battery string units other than a faulty battery string unit by the power conversion unit using a predetermined power threshold when the faulty battery string unit is detected.

In some embodiments, the method further includes: adjusting an input voltage state and an output voltage state of the power conversion unit by the power conversion unit, to adjust an output voltage of the battery cell in the battery string unit corresponding to the power conversion unit from the first predetermined voltage range to the second predetermined voltage range, where the second predetermined voltage range is within the first predetermined voltage range.

In some embodiments, the method further includes: receiving a voltage conversion instruction sent by the high-voltage battery power master control unit by the power conversion string control unit, and executing the voltage conversion instruction, to control the voltage conversion between power conversion units corresponding to the voltage conversion instruction.

In some embodiments, the method further includes: receiving the total output power sent by the state monitoring management unit by the high-voltage battery power master control unit, and controlling the power supply module to output the total output power to the server as a total power output value of the server; or controlling the power supply module to output a predetermined total power output value to the server as the total power output value of the server.

In some embodiments, the method further includes: allocating evenly the total output power, or the predetermined total power output value to each battery string unit by the high-voltage battery power master control unit, when power information of each battery string unit meets the predetermined power condition; and determining power of an abnormal battery string unit based on the predetermined derated output power by the high-voltage battery power master control unit, and determining the power corresponding to remaining battery string units meeting the predetermined power condition based on the total output power, or the predetermined total power output value, and the power of the abnormal battery string unit when the abnormal battery string unit with power information not meeting the predetermined power condition.

In some embodiments, the method further includes:
acquiring a turn-off control instruction sent by the high-voltage battery power control unit by the battery string control unit, and executing a turn-off operation corresponding to the turn-off control instruction to turn off the power output of the adjusted battery string unit, when the power information of the adjusted battery string unit still does not meet the predetermined power condition.

In some embodiments, the method further includes:
analyzing the output power of each battery string unit by the high-voltage battery power master control unit using the state information table and the predetermined output power, and determining the voltage difference between any two battery string units based on the analysis result; and
sending a discharging control instruction to a power conversion string control unit corresponding to the relatively high-voltage battery string unit to control the relatively high-voltage battery string unit to discharge the relatively low-voltage battery string unit when the voltage difference is greater than or equal to the first predetermined voltage difference threshold. In some embodiments, the method further includes:
sending a bypass control instruction to the relatively high-voltage battery string unit by the high-voltage battery power master control unit, or the battery string control unit corresponding to the relatively high-voltage battery string unit, to control the relatively high-voltage battery string unit to bypass the first battery cell when a first battery cell with a discharging value greater than or equal to a predetermined discharge threshold is present in the relatively high-voltage battery string unit.

In some embodiments, the method further includes:
sending a bypass control instruction to the relatively low-voltage battery string unit by the high-voltage battery power master control unit, or the battery string control unit corresponding to the relatively low-voltage battery string unit, to control the relatively low-voltage battery string unit to bypass the second battery cell, when a second battery cell with a charging value greater than or equal to a predetermined charging threshold is present in the relatively low-voltage battery string unit.

In some embodiments, the method further includes:
sending a bypass control instruction to a battery string unit corresponding to the low-voltage battery cell by the high-voltage battery power master control unit to control to bypass the low-voltage battery cell when a high-voltage battery cell and the low-voltage battery cell with a voltage difference greater than or equal to the second predetermined voltage difference threshold are detected to be discharged at the same time,
controlling to release a bypass state of the low-voltage battery cell by the high-voltage battery power control unit when the voltage difference between the high-voltage battery cell and the low-voltage battery cell is detected to be less than the second predetermined voltage difference threshold, so that the high-voltage battery cell and the low-voltage battery cell are discharged at the same time.

In some embodiments, the method further includes:
sending a bypass control instruction to an abnormal battery string unit corresponding to an abnormal battery cell by the high-voltage battery power control unit to control the abnormal battery string unit to bypass the abnormal battery cell when the abnormal battery cell with abnormal charging and discharging is detected in any battery string unit.

In some embodiments, the method further includes:
determining a battery string unit with any bypass battery cell as a bypass battery string unit by the high-voltage battery power master control unit, and analyzing a health state of the bypassed battery cell in the bypass battery string unit and health states of other battery string units when the bypass battery string unit is in a discharging state, and adjusting power allocation of the bypass battery string unit using the total output power based on the analysis result; and
controlling a power conversion unit corresponding to the bypass battery string unit to continue charging a third battery cell with a charging value less than the predetermined charging threshold in the bypass battery string unit when the bypass battery string unit is in a charging state, and controlling to bypass the third battery cell when the charging value of the third battery cell is greater than or equal to the predetermined charging threshold.

In some embodiments, the method further includes:
controlling to turn off the power switching tube of the bypass battery string unit to release the bypass state of the bypassed battery cell when the bypass battery string unit meeting the predetermined charging state is detected.

In some embodiments, the method further includes:
sending a charging control instruction to a power conversion string control unit corresponding to the power conversion unit by the high-voltage battery power master control unit when the voltage of the power conversion unit is detected to be lower than the predetermined voltage threshold, so that the power conversion string control unit executes the charging control instruction and controls the turn-on and turn-off state of the power switching tube of the power conversion unit to control charging of the battery string unit corresponding to the power conversion unit.

In some embodiments, the power supply module includes an overall battery pack power unit, which includes a total voltage and current detection unit, at least one power conversion management unit connected in parallel with the total voltage and current detection unit, a voltage and current detection unit connected to the power conversion management unit, and a battery string unit connected to the voltage and current detection unit, each power conversion management unit is correspondingly connected to a voltage and current detection unit, each power conversion management unit includes a power conversion unit and a corresponding power conversion string control unit, and each battery string unit is formed by connecting multiple battery power combination cells in series.

In some embodiments, the method further includes:
detecting voltage and current information of a series branch including each battery power combination cell by the voltage and current detection unit;
detecting total voltage and current information of each series branch connected in parallel by the total voltage and current detection unit; and
receiving the total voltage and current information and each voltage and current information by the high-voltage battery power master control unit to control the charging and discharging of each battery string unit.

In some embodiments, the battery power combination cell includes a battery cell CC1, a power switching tube CQ1 and a power switching tube CQ2 connected to the battery cell CC1, a fuse CR1 and a fuse CR2 connected to the power switching tube CQ2, and an impedance matching resistor RR1 connected to the fuse CR2, where the fuse CR2 is connected in series with the impedance matching resistor RR1 and then connected in parallel with the fuse CR1.

In some embodiments, the power switching tube CQ1 and the power switching tube CQ2 are respectively connected to a battery string control unit corresponding to the battery power combination cell. A voltage monitoring point is provided between the drain and the source of the power switching tube CQ1, and a temperature collection point is provided at the power integration of the power switching tube CQ1 and the battery cell CC1. The method also includes:

collecting the voltage information of the voltage monitoring point and the temperature information of the temperature monitoring point by the battery string control unit.

In some embodiments, the battery cell CC1 is a main carrier of output energy, and the method further includes:

controlling an abnormal high-current discharging fault of a branch corresponding to the battery cell by the fuse CR1, and controlling to correct a branch to be turned on by a series branch of the fuse CR2 and the impedance matching resistor RR1 when the branch corresponding to the fuse CR1 is mistakenly fused.

In some embodiments, the power conversion unit includes a capacitor C1, a power switching tube Q1 and a power switching tube Q2 connected to the capacitor C1, an energy storage inductor L1 connected to the power switching tube Q2, a power switching tube Q3 and a power switching tube Q4 connected to the energy storage inductor L1, and a capacitor C2 connected to the power switching tube Q4, and a relay T1 is connected in parallel at both ends of the energy storage inductor L1.

In some embodiments, the power switching tubes Q1 to Q4 are connected to the power conversion string control unit corresponding to the power conversion unit, the relay T1 is connected to the power conversion string control unit, and the method further includes:

controlling the power switching tubes Q1 to Q4 and the relay T1 to be turned on and turned off by the power conversion string control unit.

In some embodiments, the power supply system includes an external output bus, and the method further includes:

controlling, by the power conversion string control unit, the relay T1 to be turned off, the power switching tube Q1 to be constantly turned on, the power switching tube Q2 to be constantly turned off, the power switching tube Q3 and the power switching tube Q4 to be alternately turned on, and adjusting the power conversion unit to a buck topology structure, when the battery string unit discharges the external output bus through the power conversion unit, and the voltage of the external output bus is higher than the voltage of the battery string unit; and controlling, the power conversion string control unit, the power switching tube Q3 to be constantly turned on, the power switching tube Q4 to be constantly turned off, the power switching tube Q1 and the power switching tube Q2 to be alternately turned on, and adjusting the power conversion unit to a boost topology when the voltage of the external output bus is lower than the voltage of the battery string unit.

In some embodiments, the method further includes:

controlling, by the power conversion string control unit, the relay T1 to be turned off, the power switching tube Q1 to be constantly turned on, the power switching tube Q2 to be constantly turned off, the power switching tube Q3 and the power switching tube Q4 to be alternately turned on, and adjusting the power conversion unit to a boost topology structure, when the battery string unit discharges to the external output bus through the power conversion unit, and the voltage of the external output bus is higher than the voltage of the battery string unit; and controlling, by the power conversion string control unit, the power switching tube Q3 to be constantly turned on, the power switching tube Q4 to be constantly turned off, the power switching tube Q1 and the power switching tube Q2 to be alternately turned on, and adjusting the power conversion unit to a buck topology structure when the voltage of the external output bus is lower than the voltage of the battery string unit.

In some embodiments, the method further includes:

controlling the switching state of the power conversion unit corresponding to the first target battery string unit by the power conversion string control unit corresponding to the first target battery string unit when a first target battery string unit and a second target battery string unit which require to be charged and discharged with each other are present; and controlling the switching state of the power conversion unit corresponding to the second target battery string unit by the power conversion string control unit corresponding to the second target battery string unit, and adjusting the topology structure corresponding to the power conversion unit.

In some embodiments, the method further includes:

controlling the switching state of the power conversion unit corresponding to the first target battery string unit by the power conversion string control unit corresponding to the first target battery string unit to reduce the voltage difference between the first target battery string unit and the second target battery string unit when the voltage difference between the first target battery string unit and the second target battery string unit is greater than a third predetermined voltage difference threshold;

controlling the switching state of the power conversion unit corresponding to the second target battery string unit by the power conversion string control unit corresponding to the second target battery string unit, and adjusting the topology structure corresponding to the power conversion unit to control charging and discharging between the first target battery string unit and the second target battery string unit.

In some embodiments, the state monitoring management unit includes total output voltage detection, total output current detection and an output switch, and the method further includes:

receiving the control instruction sent from the high-voltage battery power control unit through the output switch.

It should be noted that the embodiments of the present application include but are not limited to the above examples. It may be understood that those skilled in the art may also make settings according to actual needs under the guidance of the ideas of the embodiments of the present application, and the present application does not limit this.

In the embodiments of the present application, a power supply method of a server is provided. Through the cooperative work of the main circuit structures such as the high-voltage battery power master control unit, the battery string control unit and the power conversion string control unit, real-time collection and analysis of power information of each subsystem in the power supply system is achieved. The high-voltage battery power master control unit may also send corresponding control instructions to each subsystem according to the analysis results to realize power control of each subsystem, thereby controlling the total output power of the server. The whole main power supply path is simple and reliable, and it is not necessary to convert the high-voltage DC power supply on the input side into electric energy. The design structure between the high-voltage DC power supply inlet and the server power supply inlet is simplified, which may effectively improve the working efficiency of the power supply system and reduce heat loss. When the main power supply system outside the server operates abnormally, the power supply demand of the server may be ensured, and the conversion efficiency and working reliability of the power supply system may be ensured.

Based on the above embodiments, it may be concluded that, compared with the existing power supply system of the data center, the technical solution of the present application has the following improvements.

Improvement 1: The server backup power system and the high-voltage DC power supply system are completely parallel.

The main power path of the server power supply architecture is simpler and more reliable. It is not necessary to perform other direct current-alternating current-direct current (DC/AC/DC) power conversion on the high-voltage DC power supply on the input side due to the backup power system, which simplifies the design structure from the high-voltage DC power supply inlet to the power inlet of the server, and may effectively improve the working efficiency of the power supply system and reduce heat loss.

Improvement 2: A high-reliability backup power system is provided for the server to ensure higher working reliability of a single node of the server.

Without increasing the complexity of the main power path structure of the power supply system of the server, the high-voltage DC backup power supply system provided by the present application forms a redundant power supply structure between the main power supply paths of the server, which may effectively solve the problem of complex main power path structure of the power supply system when redundant power supply is provided to the data center by external battery energy. This ensures that when the external main power supply system of the server works abnormally, the power demand of the server may still be guaranteed, and the conversion efficiency and working reliability of the power supply system of the data center may be guaranteed.

Improvement 3: The high-voltage DC backup power supply system has a redundant parallel structure with multiple battery backup branches, which may be expanded according to power requirements of the user. The number of redundant parallel branches may be expanded. It has a health management function. When any power fails, the high-voltage DC backup power supply system may be reconstructed in a healthy way.

It may effectively solve the problem that when the power demand or backup power demand is particularly large, the backup power path and the energy conversion path of the singe battery have high conversion power, concentrated heat, difficult design, and the abnormality of a single power device causes the whole system to work abnormally. Under extremely harsh conditions, it can also effectively solve the problem that the abnormal working condition of a single node failure causes the corresponding energy supply conversion unit in the DC backup power supply system to work abnormally. In the solution proposed in the present application, the high-voltage DC backup power supply system may be self-redundant and self-reconstructed, and the working level of the backup power system has a health management function. In addition, the abnormal unit may be removed to ensure that the high-voltage DC backup power system provides efficient and highly reliable backup power requirements for the server.

Improvement 4: The charging/discharging conversion unit of the backup battery is a variable-structure high-frequency bidirectional energy switching structure.

With the energy switching structure, voltage stabilization requirements for charging and discharging of the backup battery may be achieved under one power conversion structure. Compared with the traditional structure in which charging and discharging powers are separated, the energy switching structure is simpler and has a higher power density. When different power conversion structures in the backup power system are redundant, converted in parallel and in series with each other, the required target voltage may be converted more efficiently and reliably.

Improvement 5: The high-voltage battery power control unit is a more intelligent, autonomous and self-controlled system.

The high-voltage battery power control unit in the high-voltage DC backup power supply system makes it easier to achieve comprehensive coordination of the whole power supply system. By aggregating the data information of each subsystem into the high-voltage battery power control unit, the comprehensive processing of data is convenient. The intelligent regulation of energy supply conversion may be achieved for different application conditions. The number of working branches of the backup battery may be regulated according to the total backup power demand to ensure higher efficiency of backup power conversion of the battery. For example, when the output power is very small, only one of the backup battery paths may be allowed to work, and the other paths are in a standby and closed state. Comprehensive data processing through the high-voltage battery power control unit also facilitates fault diagnosis, autonomous health management, and system fault reconstruction of the whole high-voltage DC backup power supply system. The ability of high control ensures high reliability of the high-voltage DC backup power supply system.

Improvement 6: Short circuit and open circuit faults of any battery cell may be located, shielded and reconstructed.

A series-parallel structure of a battery cell, a power switch and a fuse is proposed, which may achieve that the redundant parallel connection of the power switch may shield the fault when the battery cell has an open circuit fault. When a battery cell has a short circuit fault, the short circuit is shielded by the fuse and the power switching tube. When the impedance of the power switching tube is low, the short circuit fault is automatically shielded. When the impedance of the power switching tube is high, the short circuit fault is cut off by the fuse. With the design of double fuse branches, the fusing current of the fuse may be appropriately selected to ensure that the short circuit fault is cut off and the battery cell is overloaded.

Improvement 7: When any one or several battery cells in each backup battery branch fail, the normal operation of the backup battery branch will not be affected. Different backup battery branches may continue to output redundantly in parallel, which ensures the full energy output of the backup power supply system to the maximum extent on the basis of redundant reliability.

When any one or several battery cells in any battery branch fail, the fault may be reconstructed autonomously and various failure modes of the faulty cells may be shielded. Even if the total output voltage of the backup battery is reduced, the power conversion units connected in series on the output side may convert the wide input voltage into a stable output voltage, so as to continue to ensure redundant parallel connection of different backup battery branches to meet the power demand of the high-voltage power supply output bus.

Improvement 8: Based on the real-time data feedback from battery monitoring, the battery cells in a single battery pack branch may be classified and controlled according to the voltage values of the battery cell and the resistance value of the battery. During charging, the battery cells with low voltage may be selectively charged. During discharging, the over-discharged battery cells may be selectively shielded to ensure voltage consistency requirements of the battery cell.

Improvement 9: The battery pack in the high-voltage DC backup power supply system does not require other balancing circuits;

The redundant parallel battery packs serve as each other's balancing units, and multi-control modes of constant voltage and constant current may be realized through the power conversion unit in the middle, and active balancing of battery cells in the battery string unit may be realized.

Battery cells with high voltage in a set of battery string units may be controlled to perform balanced charging for the battery cells with low voltage in any parallel and redundant battery string units. The constant current voltage value of the intermediate power conversion unit may be controlled to control the balancing speed, so as to realize active balancing between battery cells in different battery string units, eliminate the balancing circuit design in the battery string unit, and improve the power density. The balancing effect is good, and the balancing speed is fast.

Improvement 10: Two redundant parallel battery string units may charge and discharge each other;

The two power conversion units connected in series in the middle may achieve a higher degree of freedom when one input voltage is converted to another output voltage. The power conversion unit may adjust the topology structure to further improve the conversion efficiency while ensuring the freedom of voltage conversion.

The problem of large voltage difference between the two battery string units during charging and discharging may be effectively solved, and a wider range of voltage conversion may be achieved through multi-level conversion of two power conversion units.

When the voltage difference between the two battery string units for charging and discharging is small, the structure of one of the two power conversion units may be changed to reduce the number of voltage conversions, improve conversion efficiency, reduce the complexity of conversion topology, and improve reliability.

Improvement 11: One fuse is connected in series with another fuse and a low impedance resistor is connected in parallel;

The two fuses may serve as redundant backup for each other, which may ensure that a single fuse path does not have too much design margin, and a failure mode may be effectively and quickly cut off when a battery short circuit occurs.

It should be noted that, for the sake of simple description, the method embodiments are all expressed as a series of action combinations, but those skilled in the art should know that the embodiments of the present application are not limited by the described order of actions, because according to the embodiments of the present application, some steps may be performed in other orders or simultaneously. Secondly, those skilled in the art should also know that the embodiments described in the specification are all one of the embodiments of the present application, and the actions involved are not necessarily required by the embodiments of the present application.

In addition, an embodiment of the present application also provides an electronic device, including a processor, a memory, and a computer program stored in the memory and executable on the processor. When the computer program is executed by the processor, the various processes of the above embodiments of the power supply method of the server are implemented, and the same technical effect may be achieved, which are not be described herein to avoid repetition.

Figure 7:
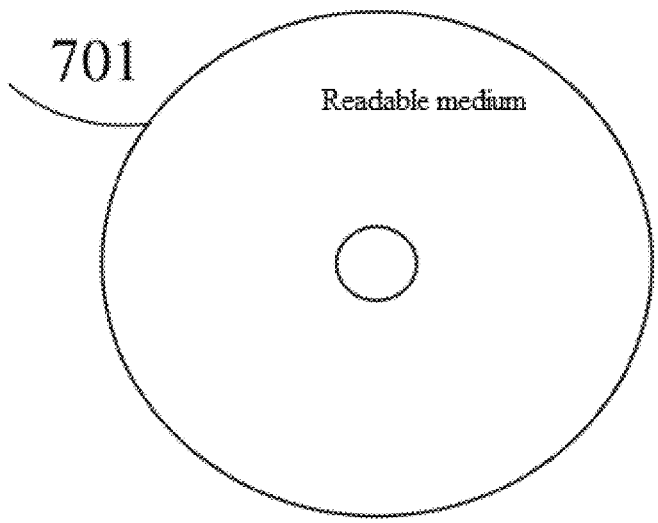
FIG. 7 is a schematic diagram of a computer readable medium according to an embodiment of the present application.

As shown in FIG. 7, the embodiment of the present application further provides a non-transitory computer readable storage medium 701, on which a computer program is stored. When the computer program is executed by the processor, each process of the above embodiment of the power supply method of the server is implemented, and the same technical effect may be achieved, which is not described herein to avoid repetition. The non-transitory computer readable storage medium 701 is, for example, a read-only memory (ROM), a random access memory (RAM), a magnetic disk or an optical disk, etc.

Figure 8:
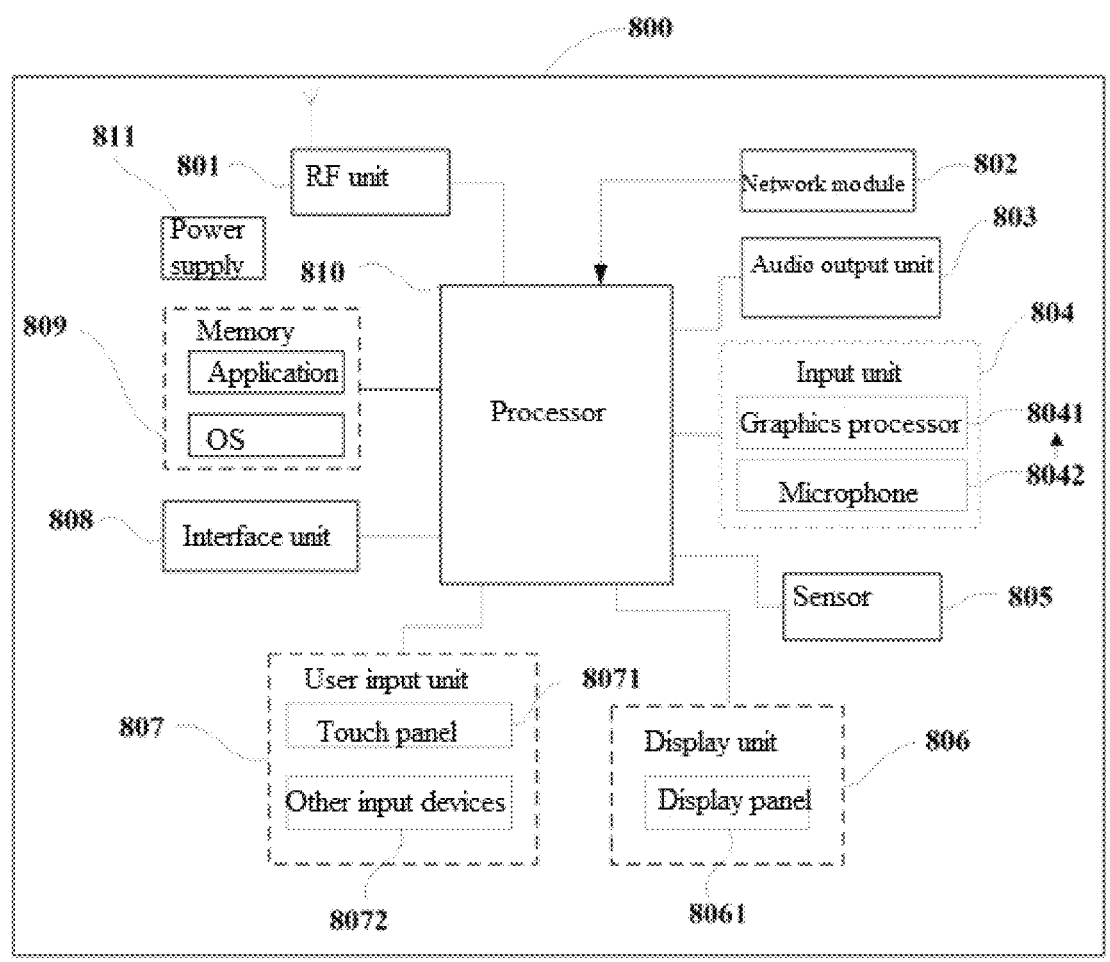
FIG. 8 is a block diagram of an electronic device according to an embodiment of the present application.

FIG. 8 is a schematic diagram of a hardware structure of an electronic device implementing various embodiments of the present application.

The electronic device 800 includes but is not limited to, a radio frequency unit 801, a network module 802, an audio output unit 803, an input unit 804, a sensor 805, a display unit 806, a user input unit 807, an interface unit 808, a memory 809, a processor 810, and a power supply 811. Those skilled in the art will appreciate that the structure of the electronic device involved in the embodiments of the present application does not constitute a limitation on the electronic device, and the electronic device may include more or fewer components than shown, or a combination of some components, or a different arrangement of components. In the embodiments of the present application, the electronic device includes, but is not limited to, a mobile phone, a tablet computer, a laptop computer, a PDA, a vehicle-mounted terminal, a wearable device, and a pedometer.

It should be understood that in the embodiment of the present application, the radio frequency unit 801 may be used to receive and send signals during transmission and reception of information or calls. After downlink data is received from the base station, it is processed by the processor 810. In addition, the uplink data is sent to the base station. Generally, the radio frequency unit 801 includes but is not limited to an antenna, at least one amplifier, a transceiver, a coupler, a low noise amplifier, a duplexer, etc. In addition, the radio frequency unit 801 may also communicate with the network and other devices through a wireless communication system.

The electronic device provides users with wireless broadband Internet access through the network module 802, such as helping users to send and receive emails, browse web pages, and access streaming media.

The audio output unit 803 may convert the audio data received by the radio frequency unit 801 or the network module 802 or stored in the memory 809 into an audio signal and output it as sound. Moreover, the audio output unit 803 may also provide audio output related to a specific function performed by the electronic device 800 (for example, a call signal reception sound, a message reception sound, etc.). The audio output unit 803 includes a speaker, a buzzer, a receiver, etc.

The input unit 804 is configured to receive audio or video signals. The input unit 804 may include a graphics processing unit (GPU) 8041 and a microphone 8042. The GPU 8041 processes the image data of a static picture or video obtained by an image capture device (such as a camera) in a video capture mode or an image capture mode. The processed image frame may be displayed on the display unit 806. The image frame processed by the GPU 8041 may be stored in the memory 809 (or other storage medium) or sent via the radio frequency unit 801 or the network module 802. The microphone 8042 may receive sound and process such sound into audio data. The processed audio data may be converted into a format output that may be sent to a mobile communication base station via the radio frequency unit 801 in the case of a telephone call mode.

The electronic device 800 also includes at least one sensor 805, such as a light sensor, a motion sensor, and other sensors. The light sensor includes an ambient light sensor and a proximity sensor, where the ambient light sensor may adjust the brightness of the display panel 8061 according to the brightness of the ambient light, and the proximity sensor may turn off the display panel 8061 and/or the backlight when the electronic device 800 is moved to the ear. As a kind of motion sensor, the accelerometer sensor may detect the magnitude of acceleration in each direction (generally three axes), and may detect the magnitude and direction of gravity when stationary, which may be used to identify the posture of the electronic device (such as horizontal and vertical screen switching, related games, magnetometer posture calibration), vibration recognition related functions (such as pedometer, tapping), etc. The sensor 805 may also include a fingerprint sensor, a pressure sensor, an iris sensor, a molecular sensor, a gyroscope, a barometer, a hygrometer, a thermometer, an infrared sensor, etc., which will not be described herein.

The display unit 806 is configured to display information input by the user or information provided to the user. The display unit 806 may include a display panel 8061, which may be configured in the form of a liquid crystal display (LCD), an organic light-emitting diode (OLED), etc.

The user input unit 807 may be configured to receive input digital or character information, and to generate key signal input related to user settings and function control of the electronic device. The user input unit 807 includes a touch panel 8071 and other input devices 8072. The touch panel 8071, also known as a touch screen, may collect the user's touch operation on or near it (such as the user's operation on the touch panel 8071 or near the touch panel 8071 using any suitable object or accessory such as a finger, stylus, etc.). The touch panel 8071 may include two parts: a touch detection device and a touch controller. The touch detection device detects the user's touch orientation, detects the signal brought by the touch operation, and transmits the signal to the touch controller. The touch controller receives touch information from the touch detection device, converts it into the contact point coordinates, then sends it to the processor 810, receives the command sent by the processor 810 and executes it. In addition, the touch panel 8071 may be implemented in various types such as resistive, capacitive, infrared and surface acoustic waves. In addition to the touch panel 8071, the user input unit 807 may also include other input devices 8072. The other input devices 8072 may include, but are not limited to, a physical keyboard, function keys (such as volume control keys, switch keys, etc.), a trackball, a mouse, and a joystick, which are not described herein.

Further, the touch panel 8071 may be covered on the display panel 8061. When the touch panel 8071 detects a touch operation on or near it, and transmits it the processor 810 to determine the type of the touch event, and then the processor 810 provides a corresponding visual output on the display panel 8061 according to the type of the touch event. It may be understood that in one embodiment, the touch panel 8071 and the display panel 8061 are two independent components to implement the input and output functions of the electronic device, but in some embodiments, the touch panel 8071 and the display panel 8061 may be integrated to implement the input and output functions of the electronic device, which is not limited herein.

The interface unit 808 is an interface for connecting an external apparatus to the electronic device 800. For example, the external apparatus may include a wired or wireless headset port, an external power supply (or battery charger) port, a wired or wireless data port, a memory card port, a port for connecting an apparatus with an identification module, an audio input/output (I/O) port, a video I/O port, a headphone port, etc. The interface unit 808 may be used to receive input (e.g., data information, power, etc.) from an external apparatus and transmit the received input to one or more elements within the electronic device 800 or may be used to transmit data between the electronic device 800 and the external apparatus.

The memory 809 may be used to store software programs and various data. The memory 809 may mainly include a program storage area and a data storage area, where the program storage area may store an operating system, an application required for at least one function (such as a sound playback function, an image playback function, etc.), etc.; and the data storage area may store data created according to the use of the mobile phone (such as audio data, a phone book, etc.), etc. In addition, the memory 809 may include a high-speed random access memory, and may also include a non-transitory memory, such as at least one disk storage device, a flash memory device, or other transitory solid-state storage devices.

The processor 810 is the control center of the electronic device, connects various parts of the entire electronic device by using various interfaces and lines, performs various functions of the electronic device and processes data by running or executing software programs and/or modules stored in the memory 809, and calling data stored in the memory 809, so as to monitor the electronic device as a whole. The processor 810 may include one or more processing units. In some embodiments, the processor 810 may integrate an application processor and a modem processor, where the application processor mainly processes the operating system, user interfaces, and application programs, etc., and the modem processor mainly processes wireless communications. It will be appreciated that the above modem processor may not be integrated into the processor 810.

The electronic device 800 may also include a power supply 811 (such as a battery) for supplying power to various components. In some embodiments, the power supply 811 may be logically connected to the processor 810 through a power management system, thereby implementing functions such as managing charging, discharging, and power consumption management through the power management system.

In addition, the electronic device 800 includes some functional modules not shown, which will not be described herein.

It should be noted that, in the present text, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

From the description of the above implementations, those skilled in the art may clearly understand that the above embodiment methods may be implemented by means of software plus a necessary general hardware platform, and of course by hardware, but in many cases the former is a better implementation. Based on the understanding, the technical solution of the present application, or the part that contributes to the prior art, can be embodied in the form of a software product, which is stored in a storage medium (such as ROM/RAM, a magnetic disk, or an optical disk), and includes a number of instructions for a terminal (which may be a mobile phone, a computer, a server, an air conditioner, or a network device, etc.) to perform the methods of each embodiment of the present application.

The embodiments of the present application are described above with reference to the accompanying drawings, but the present application is not limited to the above specific implementations. The above specific implementations are merely illustrative and not restrictive. Under the inspiration of the present application, those skilled in the art may also make many forms without departing from the purpose of the present application and the scope of protection of the claims, all of which are within the protection of the present application.

Those skilled in the art will appreciate that the units and algorithm steps of each example described in conjunction with the embodiments disclosed in the embodiments of the present application may be implemented in electronic hardware, or a combination of computer software and electronic hardware. Whether these functions are implemented in hardware or software depends on the specific application and design constraints of the technical solution. Those skilled in the art may use different methods to implement the described functions for each specific application, but such implementation should not be considered to be beyond the scope of the present application.

Those skilled in the art may clearly understand that, for the convenience and conciseness of description, specific working processes of the above systems, devices and units may refer to corresponding processes in the above method embodiments, which will not be repeated herein.

In the embodiments provided in the present application, it should be understood that the disclosed devices and methods may be implemented in other ways. For example, the device embodiments described above are only schematic. For example, the division of units is only a logical function division. There may be other divisions in actual implementation, for example, multiple units or components may be combined or integrated into another system, or some features may be ignored or not implemented. In addition, the mutual coupling or direct coupling or communication connection shown or discussed may be indirect coupling or communication connection through some interfaces, devices or units, which may be electrical, mechanical or in other forms.

The units illustrated as separated parts may be or may not be separated physically, and the parts shown in unit may be or may not be a physical unit. That is, the parts may be located at one place or distributed in multiple network units. A skilled person in the art may select part or all units to realize the objective of achieving the technical solution of the embodiment.

In addition, each functional unit in each embodiment of the present application may be integrated into one processing unit, or each unit may exist physically and separately, or two or more units may be integrated into one unit.

If the function is implemented in the form of a software functional unit and sold or used as an independent product, it may be stored in a computer-readable storage medium. Based on the understanding, the technical solution of the present application, or the part that contributes to the conventional technology or the part of the technical solution may be embodied in the form of a software product stored in a storage medium including several instructions for a computer device (which may be a personal computer, a server, or a network device, etc.) to perform all or part of the steps of methods of various embodiments of the present application. The above storage medium includes: various media which may store program codes, such as a USB disk, a removable hard disk, a ROM, a RAM, a magnetic disk or an optical disk.

The above are merely particular embodiments of the present application, and the protection scope of the present application is not limited thereto. All of the variations or substitutions that a person skilled in the art can easily envisage within the technical scope disclosed by the present application should fall within the protection scope of the present application. Therefore, the protection scope of the present application should be subject to the protection scope of the claims.

The invention claimed is:

1. A power supply system of a server, comprising at least one power supply module, wherein the power supply module at least comprises a high-voltage battery power master control unit, at least one power conversion string control unit, at least one battery string control unit and a state monitoring management unit respectively connected to the high-voltage battery power master control unit, a power conversion unit connected to the power conversion string control unit, and a battery string unit connected to the battery string control unit, each battery string unit is correspondingly connected to a power conversion unit, and various power conversion units are connected in parallel and then connected to the state monitoring management unit;

the battery string control unit is configured to collect power information of the battery string unit, the power information comprises a plurality of voltage, current and temperature signals in the battery string unit, analyze a health state of the battery string unit based on the plurality of voltage, current and temperature signals in the battery string unit, to generate a state information table corresponding to the battery string unit, send the state information table corresponding to the battery string unit to the high-voltage battery power master control unit, receive a switching control instruction generated by the high-voltage battery power master control unit based on the state information table, and control a switching state of the battery string unit based on the switching control instruction;

the power conversion string control unit is configured to receive a power control instruction generated by the high-voltage battery power master control unit based on the state information table, and control the power conversion unit to acquire an output voltage from the battery string unit based on the power control instruction;

the power conversion unit is configured to adjust the output voltage from a first predetermined voltage range to a second predetermined voltage range, and transmit the adjusted output voltage to the state monitoring management unit, and the second predetermined voltage range is within the first predetermined voltage range; and the state monitoring management unit is configured to calculate a total output power based on the adjusted output voltage, and output the total output power to the server.

2. The power supply system according to claim 1, wherein the high-voltage battery power master control unit is configured to:

receive the state information table sent by the battery string control unit, compare the state information table with predetermined total output data, generate the switching control instruction and the power control instruction, send the switching control instruction to the battery string control unit, and send the power control instruction to the power conversion string control unit corresponding to the battery string control unit.

3. The power supply system according to claim 1, wherein the battery string control unit is configured to:

convert the switching control instruction into a switching control signal, and send the switching control signal to the battery string unit; and the battery string unit is configured to:

control a power switching tube in the battery string unit to switch to a switching state corresponding to the switching control signal.

4. The power supply system according to claim 1, wherein the power conversion string control unit is configured to:

convert the power control instruction into a power control signal, and send the power control signal to the power conversion unit; and the power conversion unit is configured to:

perform a voltage acquisition operation corresponding to the power control signal to acquire an output voltage from a battery string unit corresponding to the power conversion unit.

5. The power supply system according to claim 1, wherein the power conversion unit is configured to:

reallocate power to battery string units other than a faulty battery string unit based on a predetermined power threshold when the faulty battery string unit is detected.

6. The power supply system according to claim 1, wherein the power conversion unit is further configured to:

adjust an input voltage state and an output voltage state of the power conversion unit, to adjust an output voltage of a battery cell in a battery string unit corresponding to the power conversion unit from the first predetermined voltage range to the second predetermined voltage range.

7. The power supply system according to claim 1, wherein the power conversion string control unit is configured to:

receive a voltage conversion instruction sent by the high-voltage battery power master control unit, and execute the voltage conversion instruction, to control voltage conversion between power conversion units corresponding to the voltage conversion instruction.

8. The power supply system according to claim 6, wherein the high-voltage battery power master control unit is configured to:

receive the total output power sent by the state monitoring management unit, and control the power supply module to output the total output power to the server as a total power output value of the server; or control the power supply module to output a predetermined total power output value to the server as the total power output value of the server.

9. The power supply system according to claim 8, wherein the high-voltage battery power master control unit is further configured to:

allocate evenly the total output power, or the predetermined total power output value to each battery string unit when power information of each battery string unit meets a predetermined power condition; and determine power of an abnormal battery string unit based on a predetermined derated output power, and calculate power corresponding to remaining battery string units that meets the predetermined power condition based on the total output power, or the predetermined total power output value and the power of the abnormal battery string unit, when the abnormal battery string unit with power information not meeting the predetermined power condition is present.

10. The power supply system according to claim 9, wherein the battery string control unit is configured to:

acquire a turn-off control instruction sent by the high-voltage battery power control unit, and execute a turn-off operation corresponding to the turn-off control instruction, to turn off a power output of the adjusted battery string unit, when power information of the adjusted battery string unit still does not meet the predetermined power condition.

11. The power supply system according to claim 7, wherein the high-voltage battery power master control unit is configured to:

analyze output power of each battery string unit based on the state information table and the predetermined output power, and determine a voltage difference between any two battery string units based on the analysis result; and send a discharging control instruction to a power conversion string control unit corresponding to a high-voltage battery string unit to control the high-voltage battery string unit to discharge a low-voltage battery string unit when the voltage difference is greater than or equal to a first predetermined voltage difference threshold.

12. The power supply system according to claim 11, wherein the high-voltage battery power master control unit, or a battery string control unit corresponding to the high-voltage battery string unit, is configured to:

send a bypass control instruction to the high-voltage battery string unit to control the high-voltage battery string unit to bypass a first battery cell, when the first battery cell with a discharging value greater than or equal to a predetermined discharging threshold is present in the high-voltage battery string unit.

13. The power supply system according to claim 11, wherein the high-voltage battery power master control unit, or a battery string control unit corresponding to the low-voltage battery string unit, is configured to:

send a bypass control instruction to the low-voltage battery string unit to control the low-voltage battery string unit to bypass a second battery cell, when the second battery cell with a charging value greater than or equal to a predetermined charging threshold is present in the low-voltage battery string unit.

14. The power supply system according to claim 11, wherein the high-voltage battery power master control unit is configured to:
send a bypass control instruction to a battery string unit corresponding to a low-voltage battery cell to control to bypass the low-voltage battery cell when a high-voltage battery cell and the low-voltage battery cell with a voltage difference greater than or equal to a second predetermined voltage difference threshold are detected to be discharged at the same time; and
control to release a bypass state of the low-voltage battery cell when the voltage difference between the high-voltage battery cell and the low-voltage battery cell is less than the second predetermined voltage difference threshold, so that the high-voltage battery cell and the low-voltage battery cell are discharged at the same time.

15. The power supply system according to claim 11, wherein the high-voltage battery power master control unit is configured to:
send a bypass control instruction to an abnormal battery string unit corresponding to an abnormal battery cell to control the abnormal battery string unit to bypass the abnormal battery cell, when the abnormal battery cell with abnormal charging and discharging is detected in any battery string unit.

16. The power supply system according to claim 12, wherein the high-voltage battery power master control unit is configured to:
determine a battery string unit with any bypassed battery cell as a bypass battery string unit, analyze a health state of the bypassed battery cell and health states of other battery string units in the bypass battery string unit when the bypass battery string unit is in a discharging state, and adjust power allocation of the bypass battery string unit by the total output power based on the analysis result; and
control a power conversion unit corresponding to the bypass battery string unit to continue charging a third battery cell with a charging value less than the predetermined charging threshold in the bypass battery string unit when the bypass battery string unit is in a charging state, and control to bypass the third battery cell when the charging value of the third battery cell is greater than or equal to the predetermined charging threshold.

17. The power supply system according to claim 16, wherein the high-voltage battery power master control unit is configured to:
control to turn off a power switching tube in the bypass battery string unit to release a bypass state of the bypassed battery cell when the bypass battery string unit meeting a predetermined charging state is detected.

18. A power supply method of a server, wherein a power supply system is applied to the server, the power supply system comprises at least one power supply module, the power supply module at least comprises a high-voltage battery power master control unit, at least one power conversion string control unit, at least one battery string control unit and a state monitoring management unit respectively connected to the high-voltage battery power master control unit, a power conversion unit connected to the power conversion string control unit, and a battery string unit connected to the battery string control unit, each battery string unit is correspondingly connected to a power conversion unit, various power conversion units are connected in parallel and then connected to the state monitoring management unit, and the method comprises:
by the battery string control unit, collecting power information of the battery string unit, the power information comprising a plurality of voltage, current and temperature signals in the battery string unit, analyzing a health state of the battery string unit based on the plurality of voltage, current and temperature signals in the battery string unit, to generate a state information table corresponding to the battery string unit, and sending the state information table corresponding to the battery string unit to the high-voltage battery power master control unit;
receiving a switching control instruction generated by the high-voltage battery power master control unit based on the state information table, and controlling a switching state of the battery string unit based on the switching control instruction;
receiving, by the power conversion string control unit, a power control instruction generated by the high-voltage battery power master control unit based on the state information table, and controlling the power conversion unit to acquire an output voltage from the battery string unit based on the power control instruction;
adjusting, by the power conversion unit, the output voltage from a first predetermined voltage range to a second predetermined voltage range, and transmitting the adjusted output voltage to the state monitoring management unit, wherein the second predetermined voltage range is within the first predetermined voltage range; and
calculating, by the state monitoring management unit, a total output power based on the adjusted output voltage, and outputting the total output power to the server.

19. A non-transitory computer readable storage medium storing an instruction which, when executed by one or more processors, causes the processors to perform the method according to claim 18.

* * * * *